US007788296B2

(12) United States Patent
D'Albora et al.

(10) Patent No.: US 7,788,296 B2
(45) Date of Patent: Aug. 31, 2010

(54) METHOD AND APPARATUS FOR MANAGING A COMPUTER-BASED ADDRESS BOOK FOR INCIDENT-RELATED WORK

(75) Inventors: Paul Anthony D'Albora, San Mateo, CA (US); Jeremy Shawn Henrickson, San Francisco, CA (US)

(73) Assignee: Guidewire Software, Inc., San Mateo, CA (US)

( * ) Notice: Subject to any disclaimer, the term of this patent is extended or adjusted under 35 U.S.C. 154(b) by 264 days.

(21) Appl. No.: 11/321,671

(22) Filed: Dec. 29, 2005

(65) Prior Publication Data

US 2007/0162454 A1    Jul. 12, 2007

(51) Int. Cl.
G06F 7/00       (2006.01)
G06F 15/16      (2006.01)
G06Q 10/00      (2006.01)

(52) U.S. Cl. ............................. 707/805; 709/206; 705/1

(58) Field of Classification Search .................. None
See application file for complete search history.

(56) References Cited

U.S. PATENT DOCUMENTS

| | | | |
|---|---|---|---|
| 4,567,359 A | 1/1986 | Lockwood |
| 4,642,768 A | 2/1987 | Roberts |
| 4,718,009 A | 1/1988 | Cuervo |
| 4,750,121 A | 6/1988 | Halley et al. |
| 4,766,539 A | 8/1988 | Fox |
| 4,831,526 A | 5/1989 | Luchs et al. |
| 4,837,693 A | 6/1989 | Schotz |
| 4,839,804 A | 6/1989 | Roberts et al. |
| 4,876,648 A | 10/1989 | Lloyd |
| 4,969,094 A | 11/1990 | Halley et al. |
| 5,025,138 A | 6/1991 | Cuervo |
| 5,136,502 A | 8/1992 | Van Remortel et al. |
| 5,191,522 A | 3/1993 | Bosco et al. |
| 5,235,507 A | 8/1993 | Sackler et al. |

(Continued)

FOREIGN PATENT DOCUMENTS

EP    0278132    8/1988

(Continued)

OTHER PUBLICATIONS

European Search Report from a counterpart European patent application No. 06 02 7066 dated Mar. 22, 2007.

(Continued)

*Primary Examiner*—Neveen Abel-Jalil
*Assistant Examiner*—Tarek Chbouki
(74) *Attorney, Agent, or Firm*—Van Pelt, Yi & James LLP

(57) ABSTRACT

A computer-based processing system (29) for use in managing incident-related work provides an address book (103) containing a plurality of entries that persist independently of incident durations and that comprise contact information for corresponding entities. New contact information is then received (102) via the user interface, stored, and associated with a given incident and as regards an entity. The system then provides for establishing a link (103) between the stored contact information and a corresponding entry in the address book to thereby associate information that corresponds to a same entity, such that the link can facilitate subsequent processing of at least one of an incident and contact information.

42 Claims, 16 Drawing Sheets

U.S. PATENT DOCUMENTS

| | | |
|---|---|---|
| 5,241,466 A | 8/1993 | Perry et al. |
| 5,325,291 A | 6/1994 | Garrett et al. |
| 5,446,653 A | 8/1995 | Miller et al. |
| 5,537,315 A | 7/1996 | Mitcham |
| 5,557,515 A | 9/1996 | Abbruzzese et al. |
| 5,586,313 A | 12/1996 | Schnittker et al. |
| 5,590,037 A | 12/1996 | Ryan et al. |
| 5,655,085 A | 8/1997 | Ryan et al. |
| 5,673,402 A | 9/1997 | Ryan et al. |
| 5,689,649 A | 11/1997 | Altman et al. |
| 5,704,045 A | 12/1997 | King et al. |
| 5,737,726 A | 4/1998 | Cameron et al. |
| 5,752,236 A | 5/1998 | Sexton et al. |
| 5,761,645 A | 6/1998 | Hawkins |
| 5,806,042 A | 9/1998 | Kelly et al. |
| 5,809,478 A | 9/1998 | Greco et al. |
| 5,819,230 A | 10/1998 | Christie et al. |
| 5,839,118 A | 11/1998 | Ryan et al. |
| 5,845,256 A | 12/1998 | Pescitelli et al. |
| 5,855,005 A | 12/1998 | Schuler et al. |
| 5,873,066 A | 2/1999 | Underwood et al. |
| 5,884,274 A | 3/1999 | Walker et al. |
| 5,893,072 A | 4/1999 | Zizzamia |
| 5,897,619 A | 4/1999 | Hargrove, Jr. et al. |
| 5,903,873 A | 5/1999 | Peterson et al. |
| 5,907,828 A | 5/1999 | Meyer et al. |
| 5,913,198 A | 6/1999 | Banks |
| 5,926,792 A | 7/1999 | Koppes et al. |
| 5,926,800 A | 7/1999 | Baronowski et al. |
| 5,930,759 A | 7/1999 | Moore et al. |
| 5,950,169 A | 9/1999 | Borghesi et al. |
| 5,956,691 A | 9/1999 | Powers |
| 5,966,693 A | 10/1999 | Burgess |
| 5,970,464 A | 10/1999 | Apte et al. |
| 5,974,390 A | 10/1999 | Ross |
| 5,991,733 A | 11/1999 | Aleia et al. |
| 5,991,744 A | 11/1999 | DiCresce |
| 5,999,917 A | 12/1999 | Facciani et al. |
| 6,014,632 A | 1/2000 | Gamble et al. |
| 6,026,364 A | 2/2000 | Whitworth |
| 6,041,304 A | 3/2000 | Meyer et al. |
| 6,044,352 A | 3/2000 | Deavers |
| 6,049,772 A | 4/2000 | Payne et al. |
| 6,073,242 A | 6/2000 | Hardy et al. |
| 6,098,070 A | 8/2000 | Maxwell |
| 6,105,000 A | 8/2000 | Hickman et al. |
| 6,119,093 A | 9/2000 | Walker et al. |
| 6,128,598 A | 10/2000 | Walker et al. |
| 6,161,096 A | 12/2000 | Bell |
| 6,163,770 A | 12/2000 | Gamble et al. |
| 6,182,048 B1 | 1/2001 | Osborn et al. |
| 6,205,434 B1 | 3/2001 | Ryan et al. |
| 6,263,320 B1 | 7/2001 | Danilunas et al. |
| 6,269,369 B1 | 7/2001 | Robertson |
| 6,304,859 B1 | 10/2001 | Ryan et al. |
| 6,330,541 B1 | 12/2001 | Meyer et al. |
| 6,332,125 B1 | 12/2001 | Callen et al. |
| 6,336,096 B1 | 1/2002 | Jernberg |
| 6,338,040 B1 | 1/2002 | Buman et al. |
| 6,343,272 B1 | 1/2002 | Payne et al. |
| 6,347,302 B1 | 2/2002 | Joao |
| 6,393,405 B1 | 5/2002 | Vicente |
| 6,418,415 B1 | 7/2002 | Walker et al. |
| 6,430,542 B1 | 8/2002 | Moran |
| 6,473,737 B2 | 10/2002 | Burke |
| 6,484,144 B2 | 11/2002 | Martin et al. |
| 6,584,446 B1 | 6/2003 | Buchanan et al. |
| 6,604,080 B1 | 8/2003 | Kern |
| 6,606,740 B1 | 8/2003 | Lynn et al. |
| 6,609,111 B1 | 8/2003 | Bell |
| 6,625,582 B2 | 9/2003 | Richman et al. |
| 6,684,189 B1 | 1/2004 | Ryan et al. |
| 6,684,190 B1 | 1/2004 | Powers et al. |
| 6,687,362 B1 * | 2/2004 | Lindquist et al. ........ 379/218.01 |
| 6,714,914 B1 | 3/2004 | Peters et al. |
| 6,725,201 B2 | 4/2004 | Joao |
| 6,760,709 B2 | 7/2004 | Graff |
| 6,850,890 B1 | 2/2005 | Roff |
| 6,869,362 B2 | 3/2005 | Walker et al. |
| 6,870,913 B2 * | 3/2005 | Narasimhan et al. ... 379/106.02 |
| 6,883,000 B1 * | 4/2005 | Gropper ...................... 707/10 |
| 6,937,990 B1 | 8/2005 | Walker et al. |
| 7,013,284 B2 | 3/2006 | Guyan et al. |
| 7,027,463 B2 * | 4/2006 | Mathew et al. .............. 370/463 |
| 7,072,841 B1 | 7/2006 | Pednault |
| 7,080,104 B2 | 7/2006 | Ring et al. |
| 7,113,913 B1 | 9/2006 | Davis et al. |
| 7,167,855 B1 * | 1/2007 | Koenig .......................... 707/3 |
| 7,187,932 B1 * | 3/2007 | Barchi ........................ 455/445 |
| 7,236,952 B1 | 6/2007 | D'Zmura |
| 7,249,037 B2 | 7/2007 | Koppes et al. |
| 7,265,858 B2 * | 9/2007 | Park et al. .................. 358/1.15 |
| 2001/0011223 A1 | 8/2001 | Burke |
| 2002/0004725 A1 | 1/2002 | Martin et al. |
| 2002/0013751 A1 | 1/2002 | Facciani et al. |
| 2002/0016857 A1 | 2/2002 | Harari |
| 2002/0026334 A1 | 2/2002 | Igoe |
| 2002/0032586 A1 | 3/2002 | Joao |
| 2002/0035488 A1 | 3/2002 | Aquila et al. |
| 2002/0049610 A1 * | 4/2002 | Gropper ........................ 705/1 |
| 2002/0049828 A1 * | 4/2002 | Pekarek-Kostka ........... 709/217 |
| 2002/0052764 A1 | 5/2002 | Banks |
| 2002/0057915 A1 | 5/2002 | Mann |
| 2002/0077869 A1 | 6/2002 | Doyle et al. |
| 2002/0091553 A1 | 7/2002 | Callen et al. |
| 2002/0161681 A1 | 10/2002 | Richman |
| 2002/0170966 A1 | 11/2002 | Hannigan et al. |
| 2003/0018498 A1 | 1/2003 | Banks |
| 2003/0055767 A1 * | 3/2003 | Tamura et al. ................ 705/36 |
| 2003/0065540 A1 | 4/2003 | Callen et al. |
| 2003/0069874 A1 | 4/2003 | Hertzog et al. |
| 2003/0115126 A1 * | 6/2003 | Pitroda ........................ 705/36 |
| 2003/0154109 A1 | 8/2003 | Martin et al. |
| 2003/0158860 A1 * | 8/2003 | Caughey .................... 707/200 |
| 2003/0182310 A1 * | 9/2003 | Charnock et al. ......... 707/104.1 |
| 2003/0220966 A1 | 11/2003 | Hepper et al. |
| 2004/0059786 A1 * | 3/2004 | Caughey .................... 709/206 |
| 2004/0064404 A1 * | 4/2004 | Cohen et al. .................. 705/38 |
| 2004/0119760 A1 | 6/2004 | Grossman et al. |
| 2004/0133561 A1 | 7/2004 | Burke |
| 2004/0172304 A1 | 9/2004 | Joao |
| 2004/0186896 A1 * | 9/2004 | Daniell et al. .............. 709/207 |
| 2004/0215493 A1 | 10/2004 | Koppes et al. |
| 2004/0225535 A1 | 11/2004 | Bond et al. |
| 2004/0229671 A1 | 11/2004 | Stronach et al. |
| 2004/0236792 A1 * | 11/2004 | Celik ....................... 707/104.1 |
| 2004/0267595 A1 * | 12/2004 | Woodings et al. ............... 705/9 |
| 2005/0060638 A1 * | 3/2005 | Mathew et al. .............. 715/500 |
| 2005/0075947 A1 | 4/2005 | Bell et al. |
| 2005/0120084 A1 * | 6/2005 | Hu et al. ..................... 709/206 |
| 2005/0149376 A1 | 7/2005 | Guyan et al. |
| 2005/0193063 A1 | 9/2005 | Cannata et al. |
| 2005/0250552 A1 | 11/2005 | Eagle et al. |
| 2006/0031088 A1 | 2/2006 | Risen, Jr. et al. |
| 2006/0052091 A1 * | 3/2006 | Onyon et al. ................ 455/415 |
| 2006/0136274 A1 * | 6/2006 | Olivier et al. .................. 705/4 |
| 2006/0155750 A1 * | 7/2006 | Fowler et al. ............... 707/102 |
| 2006/0190546 A1 * | 8/2006 | Daniell ....................... 709/206 |
| 2006/0195422 A1 * | 8/2006 | Cadiz et al. ................... 707/3 |
| 2006/0212452 A1 * | 9/2006 | Cornacchia, III ............. 707/10 |
| 2006/0218017 A1 | 9/2006 | Ren et al. |
| 2006/0242210 A1 * | 10/2006 | Ring et al. .................. 707/204 |
| 2007/0005463 A1 | 1/2007 | Davis et al. |
| 2007/0070940 A1 * | 3/2007 | Vander Veen et al. ....... 370/328 |

| | | | |
|---|---|---|---|
| 2007/0106698 A1* | 5/2007 | Elliott et al. ............... 707/200 |
| 2007/0118533 A1* | 5/2007 | Ramer et al. ................ 707/10 |
| 2007/0150542 A1* | 6/2007 | Sommerer .................. 709/206 |
| 2007/0156465 A1 | 7/2007 | Walker et al. |
| 2007/0162454 A1* | 7/2007 | D'Albora et al. ............ 707/10 |
| 2007/0265889 A1 | 11/2007 | Koppes et al. |
| 2007/0276705 A1 | 11/2007 | Walker et al. |

FOREIGN PATENT DOCUMENTS

| | | |
|---|---|---|
| EP | 0297780 | 1/1989 |
| EP | 0332770 | 9/1989 |
| EP | 0472786 | 3/1992 |
| EP | 0895173 | 2/1999 |
| EP | 1338966 | 8/2003 |
| WO | 84/01448 | 4/1984 |
| WO | 93/00643 | 1/1993 |
| WO | 93/08546 | 4/1993 |
| WO | 93/22735 | 11/1993 |
| WO | 94/10637 | 5/1994 |
| WO | 95/03569 | 2/1995 |
| WO | 96/19774 | 6/1996 |
| WO | 96/21903 | 7/1996 |
| WO | 96/24103 | 8/1996 |
| WO | 97/41524 | 11/1997 |
| WO | 98/12616 | 3/1998 |
| WO | 98/21680 | 5/1998 |
| WO | 98/38563 | 9/1998 |
| WO | 99/01810 | 1/1999 |
| WO | 99/21116 | 4/1999 |
| WO | 99/22330 | 5/1999 |
| WO | 99/23589 | 5/1999 |
| WO | 99/24891 | 5/1999 |
| WO | 99/27482 | 6/1999 |
| WO | 99/44111 | 9/1999 |
| WO | 99/60537 | 11/1999 |
| WO | 00/13101 | 3/2000 |
| WO | 00/17800 | 3/2000 |
| WO | 00/23927 | 4/2000 |
| WO | 00/52616 | 9/2000 |
| WO | 00/52866 | 9/2000 |
| WO | 00/57310 | 9/2000 |
| WO | 00/63812 | 10/2000 |
| WO | 00/63813 | 10/2000 |
| WO | 00/63815 | 10/2000 |

OTHER PUBLICATIONS

Guidewire Software, "Guidewire ClaimCenter Components", Jan. 2004.

Goodcontacts Research Ltd., "GoodContacts Synchronizer Solution", 2003.

Christopher B. Eide, "Guidewire's pending U.S. Appl. No. 11/321,671", Letter from Morrison Foerster, Apr. 2, 2010.

"Non-Final Office Action for U.S. Appl. No. 11/086,889", Nov. 12, 2009.

"Amendment A for U.S. Appl. No. 11/086,889", Feb. 12, 2010.

"Resubmitted Amendment A for U.S. Appl. No. 11/086,889", Mar. 18, 2010.

* cited by examiner

METHOD AND APPARATUS FOR MANAGING A COMPUTER-BASED ADDRESS BOOK FOR INCIDENT-RELATED WORK

TECHNICAL FIELD

This invention relates generally to management of incident-related work and more particularly to computer-based management of address books for incident-related work.

BACKGROUND

Various incidents occur that require substantial information processing. Such incidents may involve, for example, a car accident in which an insurance claim must be processed. The processing of the claims and information related to these incidents tends to be high volume. Each incident may have several people or other entities associated with it, and each individual person will have contact information and other details that need to be collected and processed. There are concerns and issues that can arise with respect to the gathering, handling, and maintenance of such contact information.

When information is obtained regarding an incident or those individuals involved in an incident, the information will likely be associated with the incident, but will not necessarily be associated with a general address book that may be otherwise maintained by those who process the incident. Some of this contact information may be relevant only to the specific incident at issue, while other information may be useful in processing other incidents and therefore must persist within the system beyond the duration of the incident in a way that is useful for processing future events. In addition, multiple people may process or evaluate an incident and therefore the relevant incident information must be readily, accurately, and easily available to all individuals needing access to such information. Further, it is generally necessary to process the information in an efficient manner for the system to be effective.

Those skilled in the art are familiar with the existence of computer-based processing systems having an address book. It is often useful to have a centralized address book containing entries that persist in the system for an extended time. Such information can provide context for future business decisions and data for ongoing business operations. It can also provide a single point of reference to ensure that individuals can be correctly identified, for example to indicate that two contact records with the same name involved in two separate incidents actually refer to the same entity. Such an address book generally contains relevant helpful contact information that can be used when managing incident-related work. This information may include entries such as a family or entity name, a date of birth, an age, an occupation, a telephone number or a mailing address, to name a few. Depending upon the system such address book entries may or may not be associated with a specific incident.

Notwithstanding the existence of these computer-based address books, numerous issues exist with respect to their configuration and application. When information regarding an incident is first received, it generally comprises a disconnected collection of data that must be efficiently and intuitively sorted and processed. For many reasons, it may not be possible to know at the time of collecting the information which entity it refers to (if any) in the address book. For example, the person collecting the information may not have access to the address book and therefore has no way of knowing whether the collected information relates to an address book entity.

One approach to organizing contact information might be to provide for a single, common storage capability for the contact information. A single storage capability, however, will only provide for one address book, with no ability to store contacts that are associated only with a given incident (for example, a witness to an accident). Such a system would force all contacts to be stored in the common address book, which makes it difficult to distinguish between permanently valuable contact information (for example, as relates to a customer) and information that is valuable only within the context of an incident. Therefore, it is often useful to store the incident-related contact information separately from information in the address book.

Another problem with a single storage platform is that the address book does not provide any way for incident-specific contact information to be stored separately and distinctly from the permanent information stored in the address book. This is useful, for example, for holding a temporary address for correspondence related to the incident separate from any permanent address book information.

In addition, the information that is stored in the address book is typically required to be of higher quality. Incident-related contact information, however, may be gathered under sub-optimal conditions (for example, in a post-catastrophe environment) and, if forced to be stored in the address book, can pollute the data quality of the address book (for example, by introducing duplicate records as a result of a misspelling). Similarly, many companies may wish to impose higher data quality requirements on the address book (for example, requiring a zip code or a social-security number) than on the incident-related record. As a result of these higher data quality requirements, companies may wish to restrict the numbers of people who can make changes to the address book. Therefore, few people would be allowed to update the address book. Providing separate storage systems for the address book and the incident-related contact information would allow the system to restrict access for the address book while still allowing many people to enter incident-related contact information.

In light of the above-listed issues with a single, common storage capability, it may be helpful to have incident-related contact information stored separately from address book information. Further, there are times when contact information associated with an incident may need to be copied over or compared to an address book or the address book information may need to be associated with a specific incident. The comparison or updating of information between the records may be facilitated by the existence of a link between the address book and the incident information. This link may also be used to retrieve information from the linked address book record and to facilitate decision making with respect to the link.

Present computer-based address books do not provide for the effective management of incident-related work. These address books are often used by a relatively untrained (with respect to the intricacies of a computer-based processing system) work force, and therefore an intuitive approach to address book management is preferred. Further, present address books do not provide for an uncomplicated and user-friendly method of comparing or linking information. Further yet, many present address books may allow a user to inadvertently enter different or incorrect information without further notifying the user of the difference or error. Other systems do not allow information to be sorted so that certain information may persist and be stored within the system.

Simply put, present computer-based address books do not provide for an intuitive and efficient address book for supporting the managing of incident-related work that will process and organize relevant information

BRIEF DESCRIPTION OF THE DRAWINGS

The above needs are at least partially met through provision of the method and apparatus for managing a computer-based address book for incident-related work described in the following detailed description, particularly when studied in conjunction with the drawings, wherein:

FIG. 5 comprises an illustrative user interface screen shot as configured in accordance with various embodiments of the invention;

FIG. 6 comprises an illustrative user interface screen shot as configured in accordance with various embodiments of the invention;

FIG. 7 comprises an illustrative user interface screen shot as configured in accordance with various embodiments of the invention;

FIG. 8 comprises an illustrative user interface screen shot as configured in accordance with various embodiments of the invention;

FIG. 9 comprises an illustrative user interface screen shot as configured in accordance with various embodiments of the invention;

FIG. 10 comprises an illustrative user interface screen shot as configured in accordance with various embodiments of the invention;

FIG. 12 comprises an illustrative user interface screen shot as configured in accordance with various embodiments of the invention;

FIG. 13 comprises an illustrative user interface screen shot as configured in accordance with various embodiments of the invention;

FIG. 14 comprises an illustrative user interface screen shot as configured in accordance with various embodiments of the invention;

FIG. 15 comprises an illustrative user interface screen shot as configured in accordance with various embodiments of the invention;

FIG. 16 comprises an illustrative user interface screen shot as configured in accordance with various embodiments of the invention.

Figure 1:
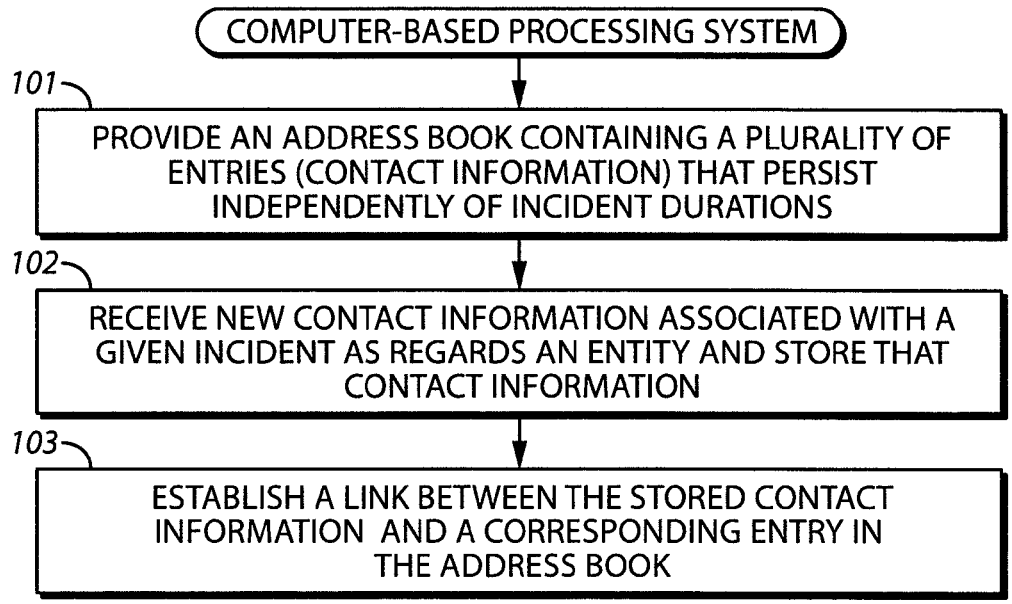
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, these various embodiments are suitable for deployment in conjunction with a computer-based processing system for use in managing incident-related work, with the system typically having a user interface. Pursuant to a general approach in accordance with these teachings, one provides within that system an address book containing a plurality of entries that persist independently of incident durations and wherein at least some of the entries comprise contact information for corresponding entities. New contact information is then received via the user interface, stored, and associated with a given incident and as regards an entity. The system then provides for establishing a link between the stored contact information and a corresponding entry in the address book to thereby associate information that corresponds to a same entity, such that the link can facilitate subsequent processing of at least one of an incident and contact information.

Establishing a link between the stored contact information and a corresponding address book entry can comprise, for example, comparing the stored contact information with the entries in the address book to determine a measure of correspondence and, when the measure of correspondence meets a predetermined level of certainty, automatically linking the stored contact information to the given entry with a link to provide linked information. Establishing a link can also comprise providing, if desired, an indication via the user interface to reflect the linked status by showing, for example, whether an incident-related contact record is linked to a record in the address book and/or whether the information contained in the stored contact information and the corresponding entry in the address book is identical.

The link between the stored contact information and a corresponding address book entry can then be used, for example, to automatically update the address book to include information that differs from corresponding information in the corresponding entry in the address book. Likewise, the stored contact information can then be updated to include differing information from the corresponding entry in the address book.

So configured, address book information and incident-related contact information may be separately stored. Further, the stored incident-related contact information and the address book information may be readily linked via a computer-based system to facilitate the management and processing of incident-related claims. As a result, management of incident-related work can be accomplished fairly intuitively by those that are relatively unskilled with computers. This, in turn, produces effective, economic, and efficient processing of incident-related work.

These and other benefits may become clearer upon making a thorough review and study of the following detailed description. Referring now to the drawings, and in particular to FIG. 1, these teachings are generally intended for application in conjunction with a computer-based processing system for use in managing incident-related work and further preferably having a user interface. Computer-based processing systems are generally understood by those skilled in the art and require no further elaboration as to their nature. In addition, a variety of user-interfaces are available and well-known in the art. By one approach the user-interface can comprise a browser-based interface.

As used herein, those skilled in the art will understand that an incident may include any of a variety of events or occurrences. For convenience and the purpose of illustration but not limitation, an insurance-related event such as a claim may comprise such an incident. As further examples, the incidents may also comprise applications for a new insurance policy, insurance policy renewal requests, or insurance policy changes.

A preferred process 100 facilitates provision 101 of an address book that is accessible to the computer-based processing system, where the address book contains a plurality of entries that persist independently of incident durations (such as, for example, the amount of time that may pass to fully process and close a given insurance claim) and wherein at least some of the entries comprise contact information for corresponding entities. The process 100 then provides for receiving 102, via the user interface, new contact information that is associated with a given incident and as regards an entity and storing that contact information to provide stored contact information. The categories of stored contact information provided by the user may vary considerably with the needs, requirements, and desires of a given system administrator and/or user base, and may also be limited by the information known to the user at the time of entry. Examples of stored contact information include, but are not limited to:

- at least one entity name;
- a government issued identifying character string;
- a date of birth;
- a family name;
- a state of incorporation;
- a marital status;
- an age;
- a legal status;
- an occupation;
- a primary business activity;
- a former moniker;
- a telephone number;
- a mailing address;
- a location address;
- a network address; and
- a customer-definable field to note but a few relevant examples.

As mentioned, this contact information is associated with a given entity. Examples of such an entity include, but are not limited to:

- a person;
- a business entity; and
- a limited liability entity.

After storing the new contact information, the process 100 then provides for establishing 103 a link between the stored contact information and a corresponding entry in the address book to thereby associate information that corresponds to a same entity, such that the link can facilitate subsequent processing of at least one of an incident and contact information.

This step of establishing a link can comprise providing an indication, via the user interface, to reflect a linked status as corresponds to the stored contact information. To illustrate such an indication, and referring momentarily to FIG. 5, an example of a given browser-based interface 500 is provided to present an illustrative approach to facilitating the management of incident-related work as described herein.

In this illustrative example, the interface 500 provides a linking opportunity in conjunction with a specific discrete insurance claim (denoted here as "Claim (235-53-365870)").

In this example, under the heading "Parties Involved: Contacts," a first region 501 of the interface 500 displays the names of those parties involved or associated with the insurance claim, along with particular contact information (such as "Phone," "Address," "City," "State," and "Zip Code") and other fields (such as "Roles" or "Contact Prohibited?"). The specific categories of contact information and/or other fields displayed in this area of the interface 500 will vary depending on the needs of the administrator and/or user and may be specified accordingly. Thus, this first area 501 of the interface 500 is not limited to the specific fields as shown in this illustration.

When a specific party 502 from the list of parties involved is selected by a user, contact details for that party are provided in a second region 503 of the interface 500, under the heading "Contact Details." In this example, the specific party 502 selected in the first region 501 is "Ray Newton." As shown, the specific contact details for Ray Newton are provided in the second region 503 of the interface. These contact details may include information such as name, phone contact information, driver's license information, organization information, and other additional information, such as tax information, date of birth, and gender. The information and contact details provided in the second region 502 of the interface, however, will again vary depending on the needs of the administrator and/or user and may be specified accordingly, and thus is not limited to those details shown in this illustration.

Figure 5:
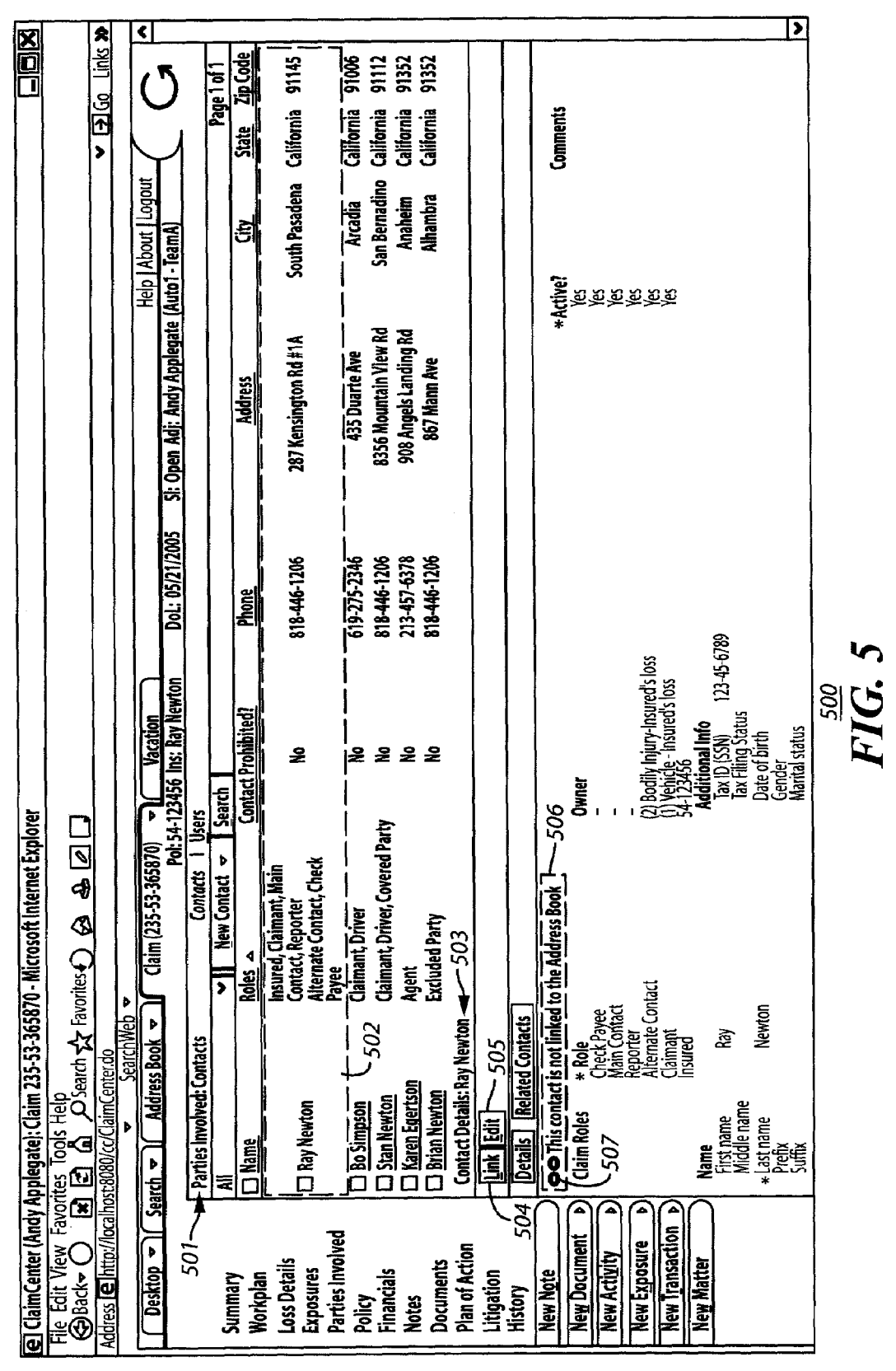

As mentioned above, the step of establishing a link 103 can comprise providing an indication, via the user interface, to reflect a linked status as corresponds to the stored contact information. An example of such a linked status indication 506 is shown in FIG. 5. More specifically, the linked status indication 506 can show whether an incident-related contact record is linked to a record in the address book. This indication can be communicated to the user in any manner that is desired by the system administrator. As an example, the linked status indication 506 in FIG. 5 comprises text stating that "This contact is not linked to the Address Book." This indication communicates to the user that the stored contact information is not linked to the address book record. Further, the linked status indication 506 may also include an icon 507 to graphically represent the linked status of the stored contact information. As an illustrative example, a broken chain link is shown alongside the written indication that the contact record is not linked to the address book. Those skilled in the art will appreciate that this icon 507 may comprise essentially any symbol, image, or representation as desired by the system administrator.

Figure 6:
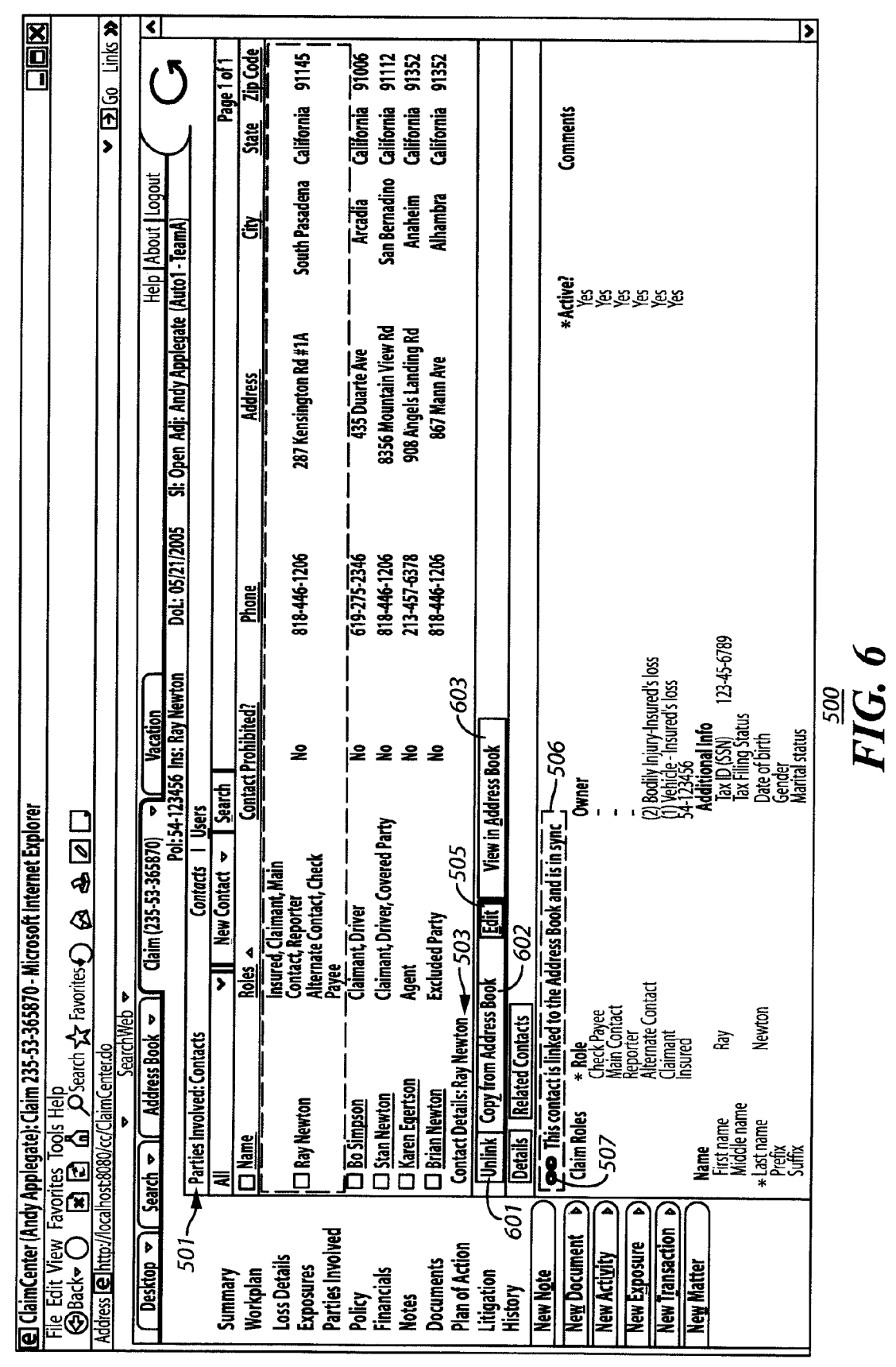

Referring now to FIG. 6, another illustrative user interface screen shot is shown. In contrast to the indication shown in FIG. 5, the linked status indication 506 shown in this illustration indicates that "This contact is linked to the Address Book . . . ," thereby communicating to the user that the stored contact information is linked to the address book record. In addition, the icon 507 included in the linked status indication 506 now shows a completed chain link. Again, the chain link icon displayed in this embodiment is only an example and the icon 507 may include any symbol, image, or representation selected by the system administrator to graphically indicate the linked status.

Further, the linked status indication 506 can also show whether information contained in the stored contact information and the corresponding entry in the address book is identical. For example, the linked status indication 506 shown in FIG. 6 includes the statement " . . . and is in sync" to specifically indicate that the information contained in the stored contact information is identical to the information in the corresponding address book entry.

Figure 8:
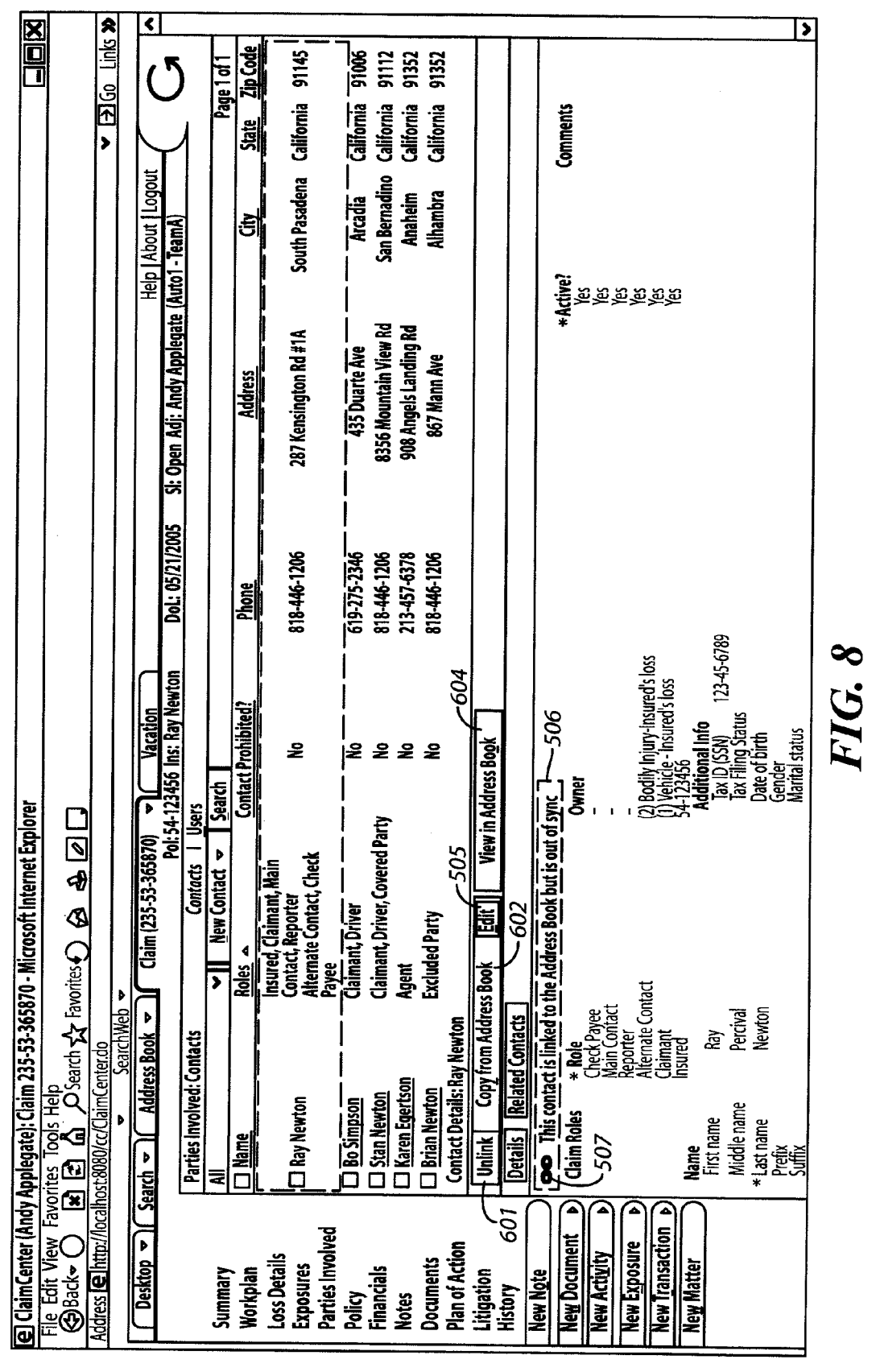

Referring momentarily to FIG. 8 as a contrary example, the linked status indication 506 includes the statement "... but is out of sync" to indicate that the corresponding information in the two records is not identical. It should be noted that in determining whether corresponding record are identical, the process does not actually need to check that the stored contact information and the address book information are identical by actually comparing the data. Rather, for example, it can determine whether the data on the linked incident-related contact record is "in sync" with the address book record. The method for determining if the records are "in sync" may be based on a set of version numbers maintained for each record. If the version numbers match, then the records may reasonably be considered to be "in sync." Likewise, if the version numbers do not match, then the records may be considered to be "out of sync." Thus, two records that are considered "out of sync" by virtue of unmatched version numbers may in fact be identical in their data. Records that are "in sync," however, will have identical data because the matched version numbers represent matching information in each record.

Further, when the stored contact information and the corresponding entry in the address book are linked but contain differing information, the linked status can further indicate an "out of sync" status by showing at least one information field that differs as between the stored contact information and the corresponding entry in the address field (these teachings would accommodate fetching the corresponding address book entry and doing a field-by-field comparison to the stored information, wherein the resulting comparison could then be used to indicate the differing fields). The differing information field can be shown in any of a variety of ways such as, for example, by highlighting the differing field in a contrasting color, displaying the differing field in a distinguishing font color or type, or displaying a statement or other notice for the user indicating which field is different.

In addition, when the stored contact information and the corresponding entry in the address book are linked but contain differing information, the linked status can show whether the differing information is due to edits to the stored information or to the corresponding entry in the address book. The linked status can indicate to the user whether the linked incident-related contact is "out of sync" due to changes to the linked incident-related contact, changes to the address book contact, or both. This indication can be provided in any of a variety of ways such as, for example, giving the user written notice to indicate where the edits occurred or highlighting the edited field in either the address book or the stored contact information using a contrasting color or font. Or, if desired, the user may be given notice of the location of the edits simply by the options that are available to the user, such as, for example, by offering the user an opportunity to save the information.

Referring again to FIG. 1, establishing the link 103 between the stored contact information and the corresponding address book entry may further comprise providing an opportunity, via the user interface, to permit a user to unlink the stored contact information from the corresponding entry in the address book after the information has been linked. Referring again momentarily to FIG. 6, the second region of the interface 503 includes a linked status indication 506 noting that the contact and the address book are linked. The user is then presented with an unlink button 601 as a selectable option. When the user selects this button (using any known computer input device), the stored contact information and the corresponding entry in the address book will become unlinked.

Figure 2:
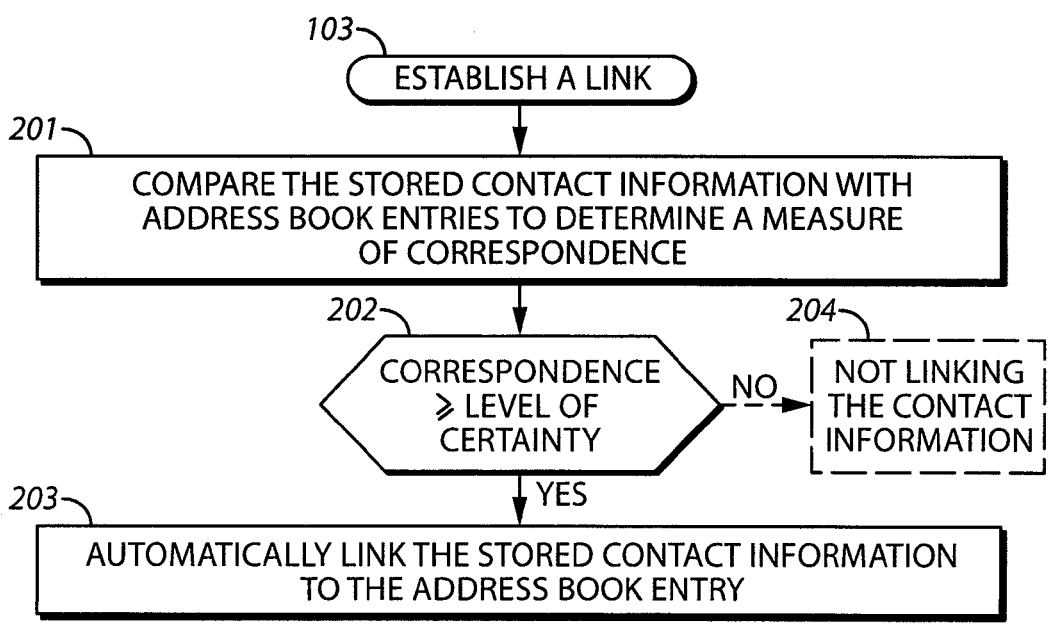
FIG. 2 comprises a flow diagram as configured in accordance with various embodiments of the invention.

The step of establishing a link 103 can comprise comparing the information in the two records. Referring now to FIG. 2, the step of establishing a link 103 can comprise comparing 201 the stored contact information with the entries in the address book to determine a measure of correspondence. When the measure of correspondence as corresponds to a given entry in the address book at least meets a predetermined level of certainty 202, the stored contact information is then automatically linked 203 to the given entry to provide linked information. Further, if the measure of correspondence 202 as corresponds to a given entry in the address book does not at least meet the predetermined level of certainty, then the stored contact information is not linked 204 to the given entry. The process of comparing 201 the two records may begin automatically upon entry of the stored contact information or may be user-initiated, such as, for example, by selecting a link button 504 as shown in FIG. 5.

If the measure of correspondence does not meet the predetermined level of certainty such that the stored contact information is not linked 204 to the given entry then the process may further comprise providing an indication, via the user interface, to reflect an unlinked status as corresponds to the stored contact information. Referring again to FIG. 5, for example, this indication can be shown in the linked status indication 506 area of the user interface and, as discussed above, may include textual information and/or an icon or other representation to display the unlinked status.

The measure of correspondence may be determined by comparing the address book entry and the stored contact information to determine the degree to which the entries are equivalent or matching. The entries are considered to be equivalent or matching when the predetermined level of certainty is achieved. The level of certainty may be any level that is defined by the system administrator according to the needs and requirements of the system and/or user, and may include any of a variety of parameters. For example, the level of certainty may be obtained when a series of steps of comparison are performed for a configurable set of fields that constitute a unique identification for the contact. As an illustration, if the configurable set of fields in the stored contact information matches to a degree of similarity to the same set of fields in the address book entry, then the level of certainty will be reached such that the stored contact information will then be automatically linked to the address book entry. Further, if the set of fields are not matched to a degree of similarity, then the level of certainty will not be reached and the stored contact information will not be linked to an address book entry.

In one embodiment, the step of comparing 201 the stored contact information with the address book entries to determine a measure of correspondence can be accomplished by comparing at least a first preselected information field in the stored contact information against a corresponding field for at least some of the address book entries. The preselected information field can be any information field entered for the stored contact information, such as, for example, name, address, telephone number, or date of birth. In a typical embodiment, the field(s) used to determine the measure of correspondence may be defined by the system administrator, but not by the user. The user could then compare the entries using the fields defined by the administrator. If the user, however, wishes to compare fields that are different from those defined by the administrator, the user would have to perform separate searches for each address book entry and then compare the entries. In another embodiment, however, the preselected information field can comprise a user-selectable preselected information field if desired. As a result, the user may select the information field of the stored contact information that the user would like to compare with the address book entries.

Upon determining that the first preselected information field in the stored contact information matches to at least a predetermined degree of similarity with the corresponding field in a particular address book entry, it can further be determined whether at least one other information field in the stored contact information matches to at least a predetermined degree of similarity with a corresponding field in the particular address book entry. Again, this at least one other information field can be any information field entered for the stored contact information, such as, for example, name, address, telephone number, or date of birth. The at least one other information field, however, will typically be different from the first preselected information field. In a typical embodiment, the field(s) used to determine the measure of correspondence may again be defined by the system administrator, not the user. In another embodiment, however, the at least one other information field may comprise a preselected information field defined by the user. As a result, the user may select the at least one other information field of the stored contact information that the user would like to compare with the address book entries.

The degree of similarity for both the first information field and the at least one other information field can and will vary according to the needs and requirements for the system and can be set by the system administrator. For example, the system may require that the information in any of the selected information fields of the stored contact information exactly match the corresponding field in the address book entry with no variation. Or the system may allow for a less than exact match such that, for example, some variation may exist between the corresponding fields but the degree of similarity will still be achieved. The degree of similarity for the first and at least one other information fields may be the same, or varying degrees of similarity may be established for each selected information field.

When the at least one other information field in the stored contact information matches to at least the predetermined degree of similarity with a corresponding field in the particular address book entry, then it is determined whether the measure of correspondence as relates to the given entry in the address book meets the predetermined level of certainty. Once the predetermined level of certainty is met, then the stored contact information will be automatically linked to the given address book entry.

Figure 13:
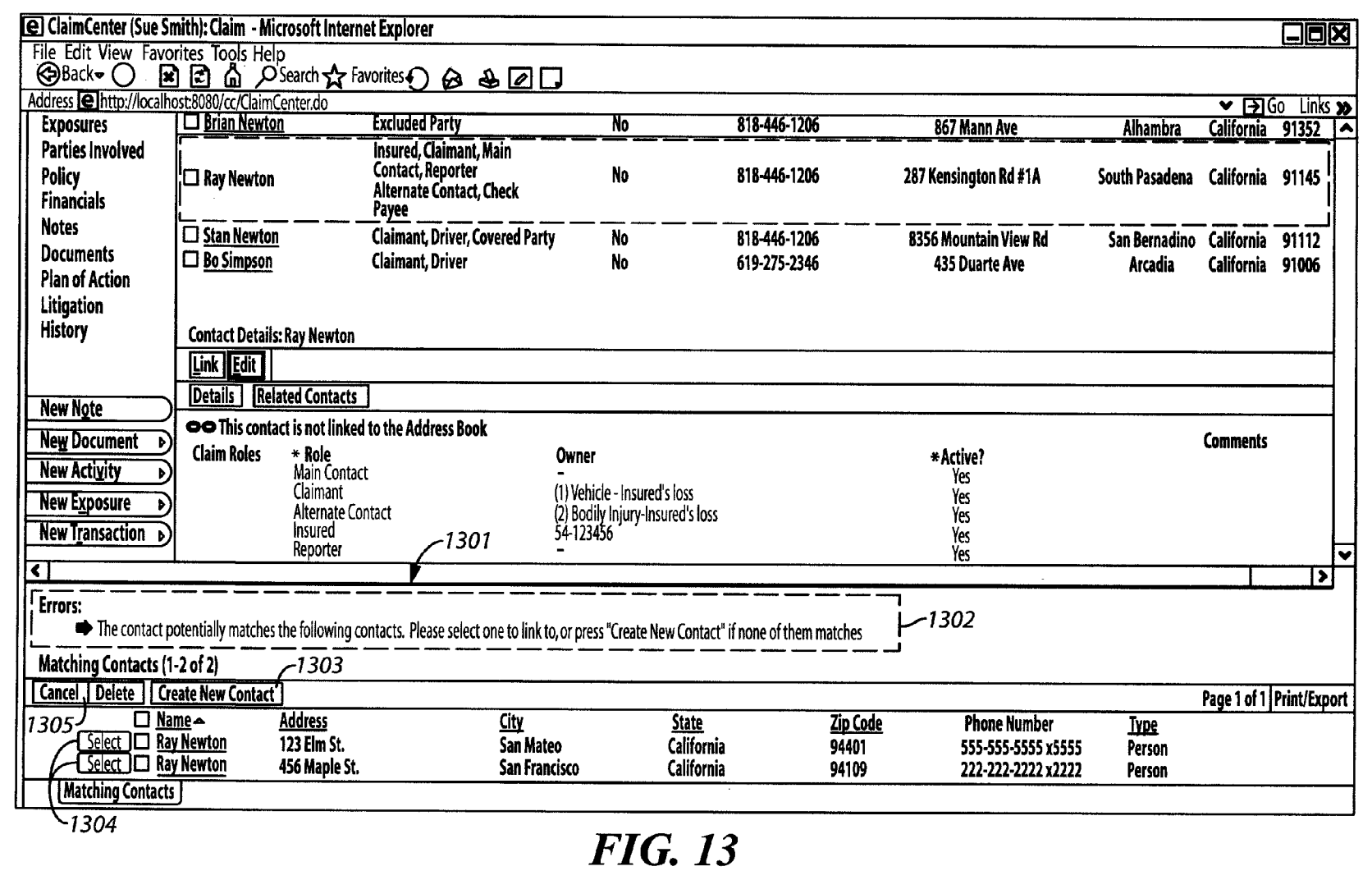

Further, by one approach and if desired, when the at least one other information field in the stored contact information does not match to at least the predetermined degree of similarity with a corresponding field in the particular address book entry, but does match to at least a second predetermined degree of similarity, then the stored contact information will not be automatically linked to the given address book entry. Rather, a user-assertable opportunity can be provided, via the user interface, to instruct the stored contact information to be linked to the given entry. To illustrate, and referring momentarily to FIG. 13, in this example, the information in the stored contact was compared to the address book. The first degree of similarity was not met, so there was not an automatic link. The second degree of similarity was met, however, so the system informs the user of the potential matches for the contact by displaying a matching status indication 1302. The matching status indication 1302 and the potential matches may be displayed, for example, in a separate "matching contacts" region of the screen 1301. The user is further prompted that a link may be established by selecting 1304 one of the potential matches. Further, in this embodiment, the user is given the option of creating a new contact if none of the potential matches is appropriate by selecting a "create new contact" button 1303.

Figure 14:
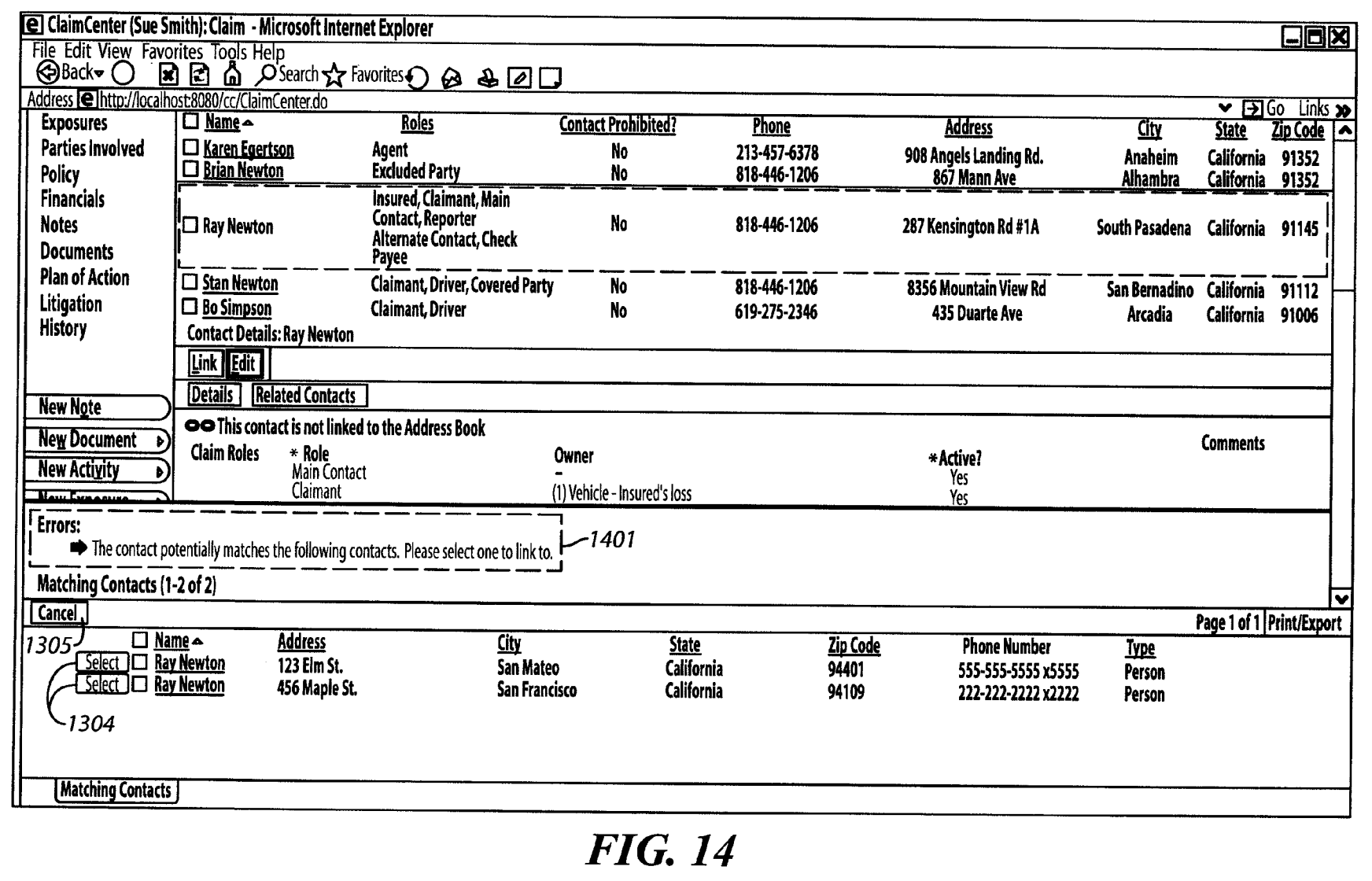

By one approach, such an option to create a new contact may only be offered, for example, if the user has the authorization to perform this function. If such authorization is absent, then the option to create a new contact will not be offered, as shown in FIG. 14. In this screen shot, the user is shown a different matching status indication 1401 that instructs the user to select 1304 from the listed potential matches, with no option to create a new contact being provided. In the embodiments shown in FIGS. 13 and 14, the user is also provided with the option to cancel 1305 if the user decides not to link to any of the listed potential matches.

For some application settings it may be preferred that the second predetermined degree of similarity be less than the first predetermined degree of similarity as applied to the at least one other information field. If the higher first predetermined degree of similarity is met, then the corresponding entries may be considered a definite match such that the level of certainty is met and an automatic link is created. If the higher first predetermined degree of similarity is not achieved, then the corresponding fields are evaluated at the lower second degree of similarity to determine if the corresponding entries may be a potential match. The potential matches could then be displayed as explained above.

If the at least one other information field in the stored contact information does not match to at least the predetermined degree of similarity with a corresponding field in the particular address book entry, and furthermore does not match to at least the second predetermined degree of similarity, then the stored contact information is not automatically linked to the given entry. The user is further prohibited from causing, via the user interface, the stored contact information from being linked to the given entry.

Figure 15:
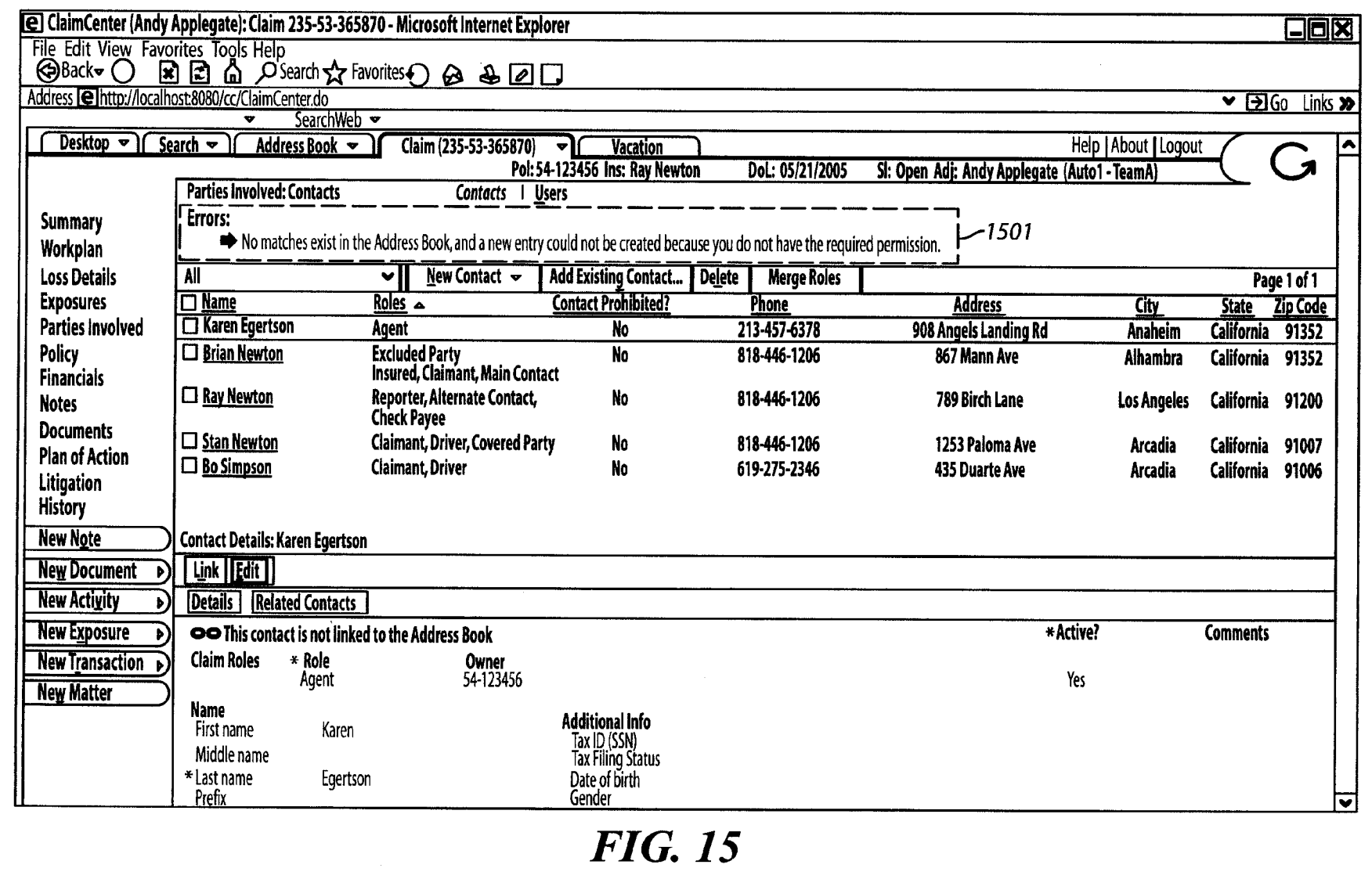

Referring now to FIG. 15, as an example, the user is notified 1501 that no matches exist in the address book. In addition, if the at least one other information field does not match to at least the first or second predetermined degree of similarity such that the user is prohibited from causing the information to be linked, then the user may be provided with an opportunity, via the user interface, to create a new address book entry to contain at least a portion of the stored contact information.

The step of providing the user with an opportunity may also comprise determining whether the user has authorization to create the new address book entry and, if the authorization is absent, denying the user the opportunity to create the entry. Referring again to FIG. 15, as an example, the user is not allowed to create a new entry because the user does not have the required authorization to perform such an action, as shown in the displayed error message 1501. If the user had the appropriate authorization, then an option to create the new entry would be displayed.

In addition, if the at least one other information field in the stored contact information does not match to at least the predetermined degree of similarity or the second predetermined degree of similarity with a corresponding field in the address book entry, then another embodiment may automatically create a new address book entry to contain at least a portion of the stored contact information.

Figure 3:
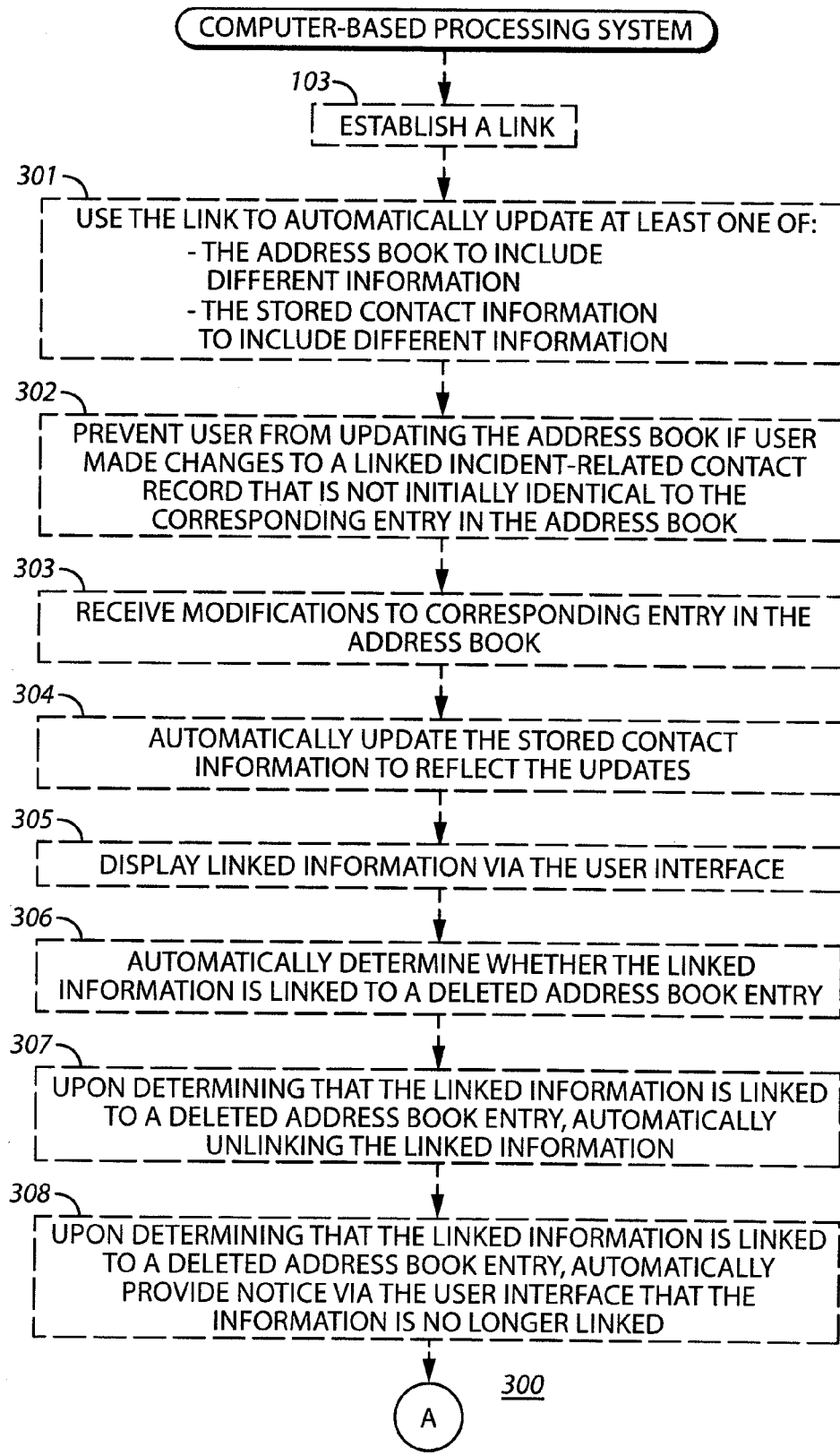
FIG. 3 comprises a flow diagram as configured in accordance with various embodiments of the invention.

Once the link is established 103, other possibilities exist as well to leverage this circumstance. To illustrate, and referring now to FIG. 3, upon establishing a link 103, this process 300 can further provide for using the link to automatically update 301 at least one of (1) the address to include information in the stored contact information that differs from corresponding information in the corresponding entry in the address book or (2) the stored contact information to include information from the corresponding entry in the address book that differs from corresponding information in the stored contact information. Once linked, the contact and the address book can receive updates from each other. This process generally involves copying data from one type of object to another and can be accomplished, for example, by a mapping procedure. Such mapping procedures are generally known to those skilled in the art and, for the sake of brevity, further elaboration will not be provided here.

The process of using the link to automatically update the address book may further optionally prevent a user 302 from updating the address book if the user made changes to a linked incident-related contact record and that linked incident-related contact record is not initially identical to the corresponding entry in the address book. If the incident-related contact record is not identical to the corresponding entry in the address book due to changes the user made to the contact records, then the entries will be "out of sync." When the entries are out of sync, then the user can be prevented from updating the address book.

Upon establishing the link 103, the process may further optionally comprise receiving modifications 303 to the corresponding entry in the address book. These modifications may be received from any user having the authorization to modify the address book entry. The process may then optionally include automatically updating 304 the stored contact information to reflect the modifications to the address book entry. Therefore, any changes made to the address book entry will then be automatically applied to any contacts linked to that address book entry, thereby allowing for consistent information among the linked contacts and the entry. In one embodiment, the address book could instigate an event when an entry is changed, wherein the handling of the event would entail calling into the incident-handling system to notify the system of the changed entry. The incident-handling system could then update all contacts linked to that entry.

Once the link is established 103, the process may also optionally call for displaying linked information 305 via the user interface. The information can be displayed in any of a variety of configurations, as desired by the user and/or system administrator, and may include any of the categories or fields of information previously listed above. Further, the process may automatically determine whether the linked information is linked to an address book entry that has been deleted 306. Then, upon determination that the linked information is linked to an address book entry that has been deleted, the link can be automatically unlinked 307. The link is automatically unlinked because there is no longer an address book entry for the contact information to be linked to, i.e. the entry no longer exists. At this point, the user may attempt to re-link the contact with another entry in the address book or take no action at all.

Figure 16:
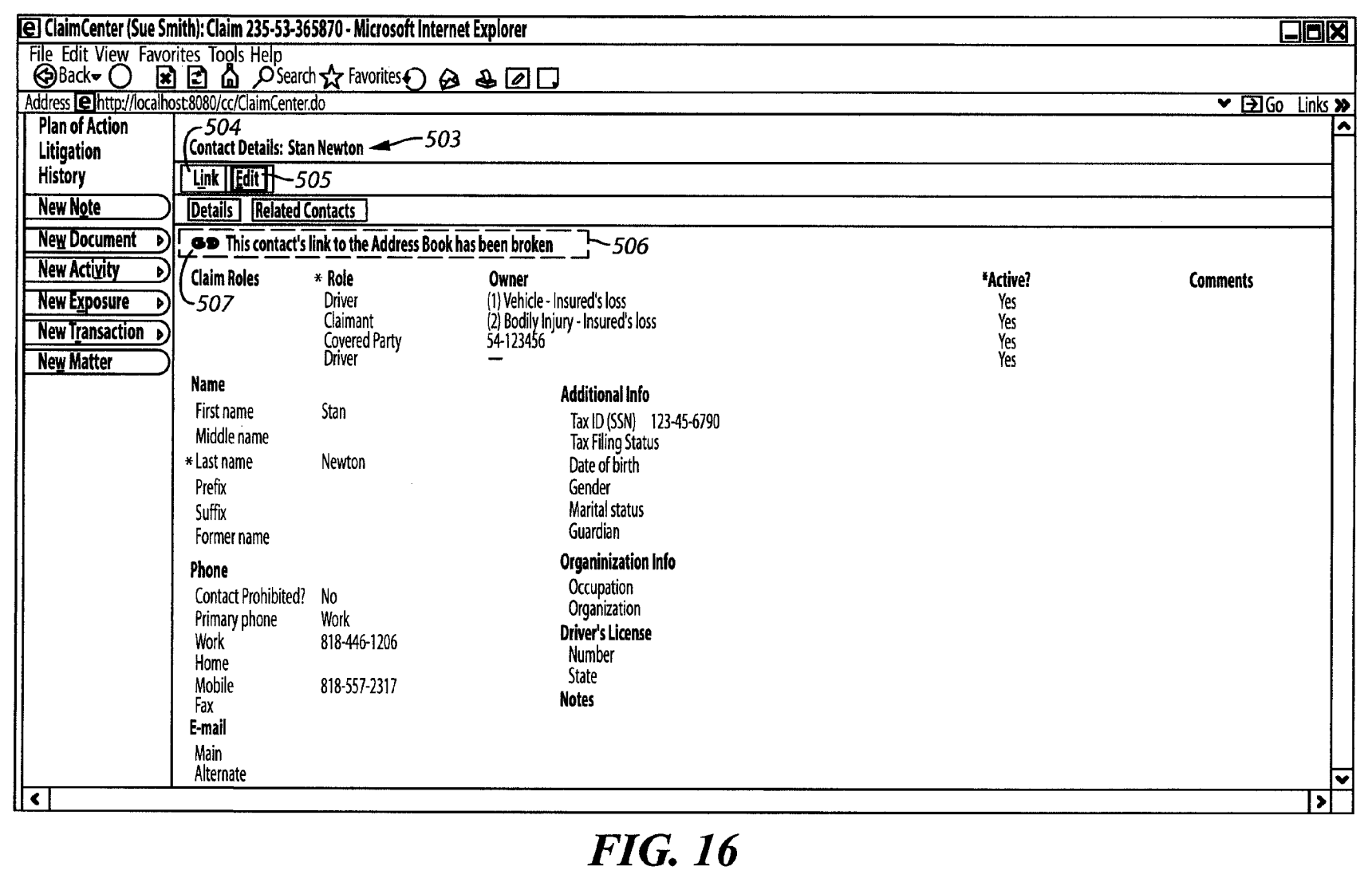

As another option, upon determining 308 that linked information is linked to an address book entry that has been deleted, the process may include automatically providing a notice, via the user interface, that the information is no longer linked. This notice can be communicated to the user in any manner that the system administrator finds appropriate. For example, and referring momentarily to FIG. 16, the notice is provided by a displayed statement in the link status indication 506 that "This contact's link to the Address Book has been broken." In addition, a graphical icon 507 showing a broken chain link is displayed. Those skilled in the art will appreciate that any text, icon, or other display may be chosen to communicate that the information is no longer linked.

Figure 4:
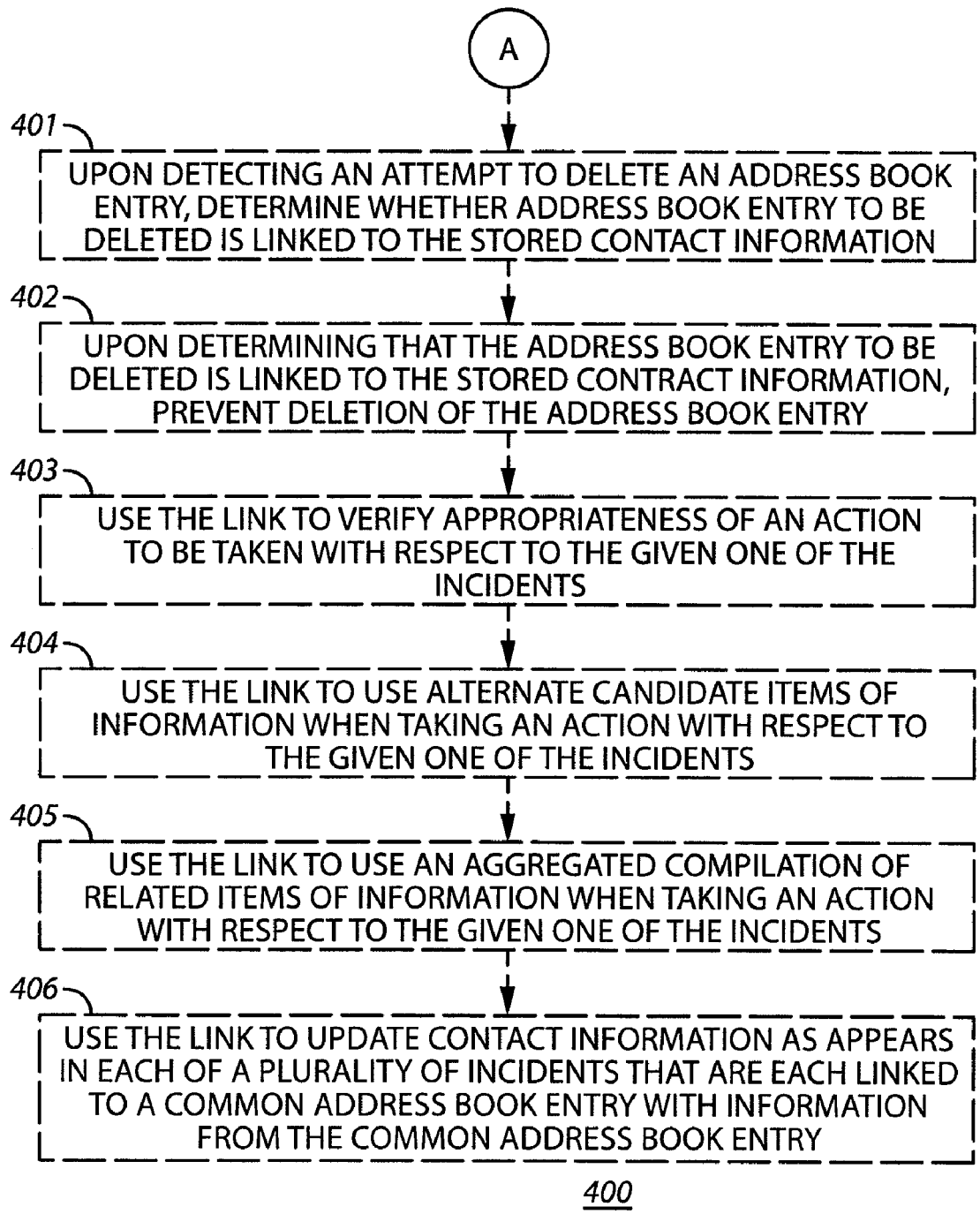
FIG. 4 comprises a flow diagram as configured in accordance with various embodiments of the invention.

Upon detecting 401 an attempt to delete an address book entry (and referring now to FIG. 4), the process 400 may further optionally comprise determining whether the address book entry to be deleted is linked to the stored contact information. This step involves determining if a link has been established between the stored contact information and the address book entry. Then, upon determining 402 that the address book entry to be deleted is linked to the stored contact information, the process prevents deletion of the address book entry. This step could be accomplished, for example, by having the address book call out to all applications using the address book and asking if any of the applications have contact information that is linked to the entry being deleted. This option can prevent a user from deleting an address book entry that is linked to contact information for a given contact.

As yet another optional approach, the process 400 may further comprise using 403 the link to verify the appropriateness of an action to be taken with respect to the given one of the incidents. Any of a variety of actions related to an incident may be evaluated using the link to determine the appropriateness of the action. For example, the action to be taken may involve issuing a check to a contact related to a specific incident. The user may wish to verify the appropriateness of issuing the check, for example, by confirming an address for the contact. However, it may be that the contact information for the incident-related contact is not complete or nonexistent or may need to be confirmed. The link can then be used to obtain the incomplete or nonexistent information from the address book or to confirm the information with the address book. As another example, the action to be taken may involve determining whether to allow a check to be issued based on the presence of a vendor and appropriate tax information within the address book.

An additional optional approach involves using 404 the link to use alternative candidate items of information when taking an action with respect to the given one of the incidents. In this way, the link is used to obtain alternative information from the linked address book that may be useful when taking an action regarding an incident. For example, the contact information for a given incident may include the specific contact information for the insured individual. This contact information may include a temporary address for where the insured is presently residing. The user may wish, however, to obtain the permanent address of the insured, which is contained in the address book. Therefore, the user may use the link to access the alternative candidate information.

As yet another option, the process 400 may involve using 405 the link to use an aggregated compilation of related items of information when taking an action with respect to the given one of the incidents. As an example, the contact information for a particular incident may contain a contact's personal name. However, this contact may also have a company name that is contained in the address book that the user needs to obtain to perform a given action. The user may use the link to access this aggregate related information from the address book to perform the action. As another example, the address book contact information for a customer may include information on past claim history which can be retrieved when processing an incident.

By a further optional approach, the process 400 can support using 406 the link to update contact information as appears in each of a plurality of incidents that are each linked to a common address book entry with information from the common address book entry. In this approach, multiple incident-related contacts are each linked to a common address book entry using, for example, one of the methods as described above. The information contained in the common address book entry can then be populated to each of the plurality of incident-related contacts to provide consistent information.

It would be understood by one skilled in the art that once a link is established between the stored contact information and a corresponding entry in the address book, many useful options and embodiments may be considered. Several figures presenting screen shots of various embodiments will now be discussed. It should be noted and understood at the outset that these screen shots are illustrative embodiments of the methods used for managing incident-related work. As such, it will be clearly understood that the options, functions, arrangements, and displays of these teachings are not limited to those specifically shown in these embodiments.

In FIG. 6, the user is notified via the user indication status 506 that the contact is linked to the address book and is in sync. The user is provided with the option to unlink the entries 601, as discussed above. The user is also provided with the option to select the edit button 505 to modify the contact details.

Figure 7:
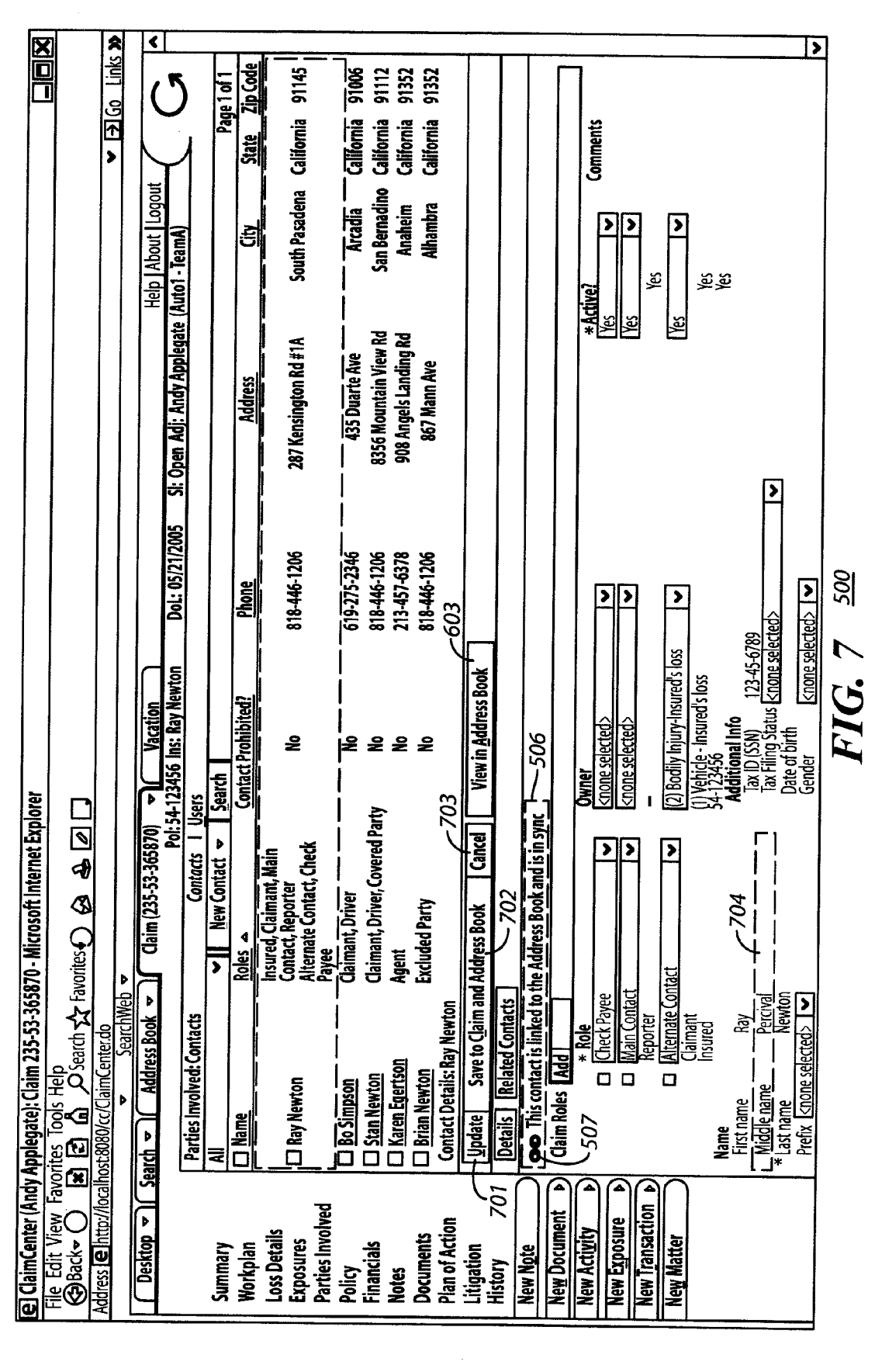

Selecting the edit button will bring up a screen, as shown in FIG. 7, wherein the user has the option to modify the fields displayed in the previous screenshot shown in FIG. 6. In this embodiment, the user can modify many of the previously displayed fields, however it is appreciated that the system may be designed to limit the fields that are displayed and/or that the user is allowed to modify. In this illustrative example, the user has entered a middle name "Percival" in the contact details for Ray Newton in a middle name edit field 704. Once an edit is made, the user may have several options available. In this embodiment, the user may select the update button 701 which will only save the edits to the local contact information or the user may save the edited information to both the claim and address book by selecting the "save to claim and address book" button 702. Further, the user may cancel the editing process and abandon the edits by selecting the "cancel" button 703. Or the user may choose to view the address book 603 that is linked to the contact information.

If the user selects the update button 701, then the edits are saved to the contact information, but not to the address book entry. The update option would be used if the user wishes to have the edited information only persist within the contact details, but not within the address book. For example, information included in the contact information fields may only be relevant for a particular claim and is therefore not appropriate for the address book. Therefore, the user may choose to include that information only in the local contact information by choosing to update the edited information. Once the update button is selected, the address book and the contact information will now be out of sync because the contact information is not exactly matched to the address book due to the edits. The user is notified of this status via the linked status indication notice 506, as shown in FIG. 8.

Figure 9:
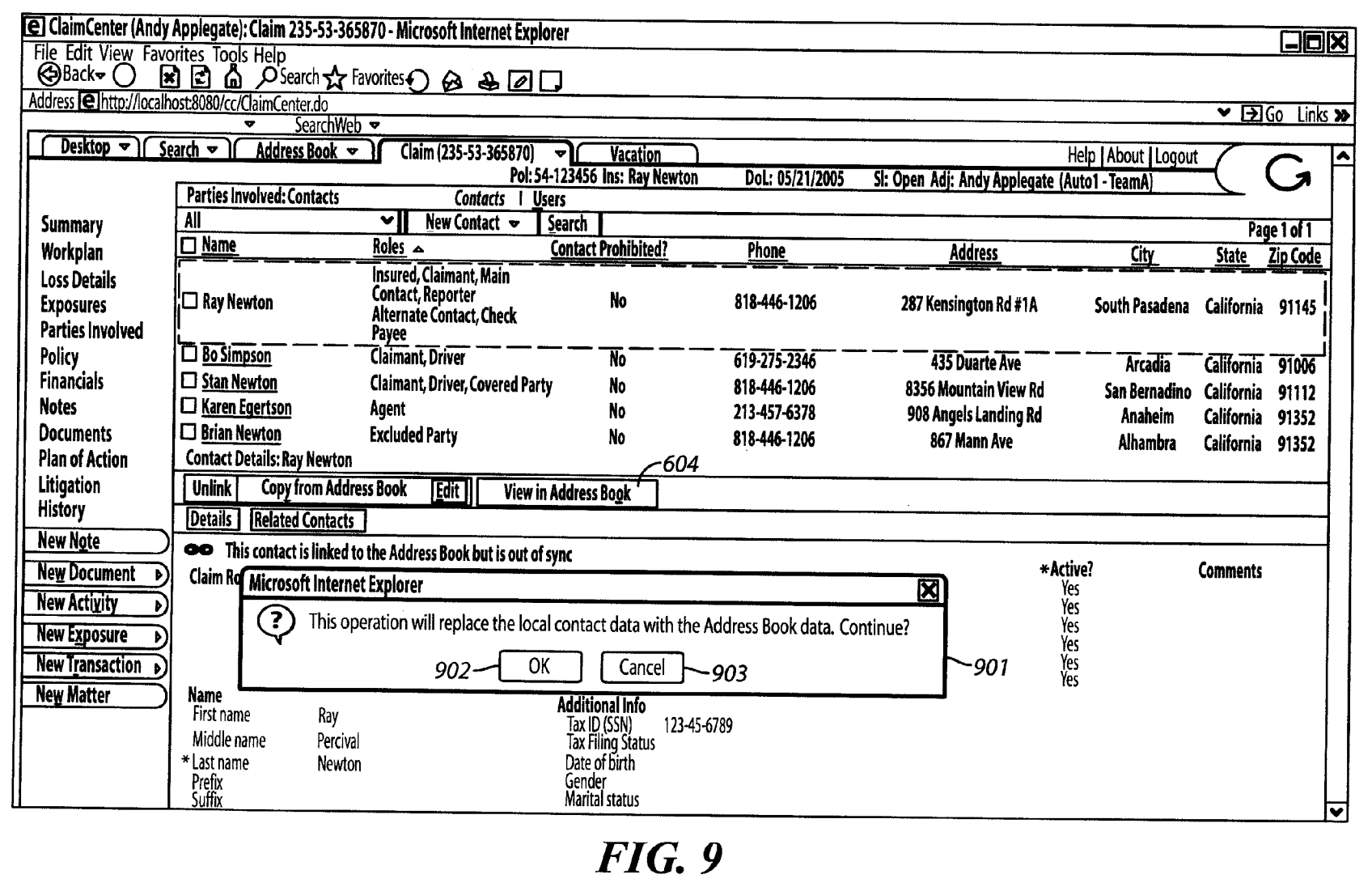

If the user then decides that it is desired for the address book and the contact to be in sync, then the user may choose to copy the information from the address book, by selecting the button 602 so-labeled as shown in FIG. 8. Referring now to FIG. 9, selecting this button can further optionally call for providing the user with a notice 901, via the user interface, that the local contact data will be replaced by the address book data. If the user selects to have the local contact data replaced, then the "OK" option 902 is selected and the contact will again be in sync with the address book. The user may also choose to abandon the copying of information by selecting cancel 903.

Figure 10:
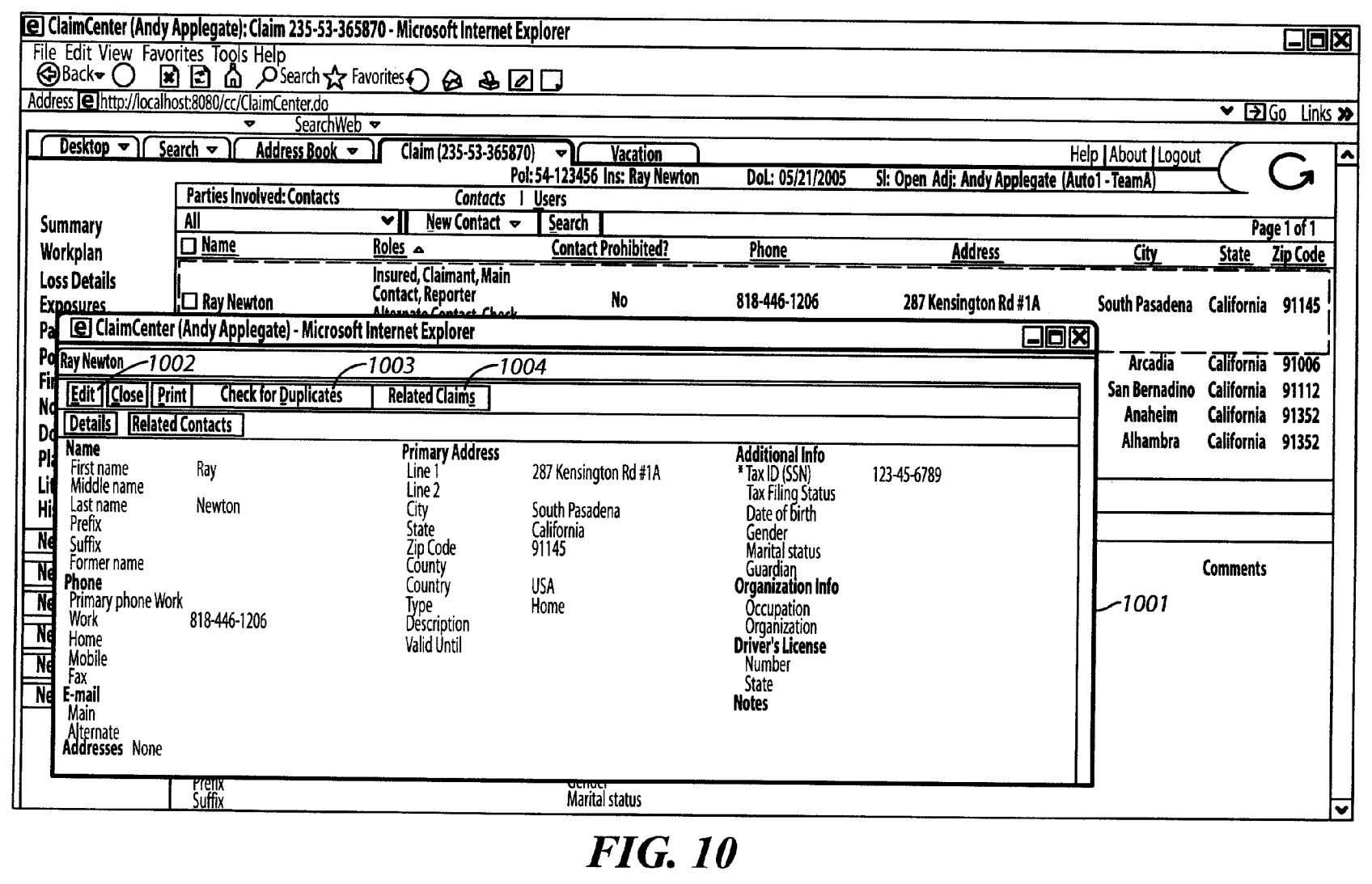

The screen shot in FIG. 9 also shows that the user has the option to view the linked entry in the address book 604. Selecting this button 604 will display to the user the corresponding address book entry that is linked to the contact. The user may choose this option, for example, to view the address book so as to compare the address book entry to the local copy of the contact information. An illustrative example of a view of the address book entry 1001 for the corresponding contact information for "Ray Newton" is shown in FIG. 10. Several options may be available to the user from the address book display, including but not limited to, editing 1002, checking for duplicates 1003, and viewing related claims 1004.

Figure 11:
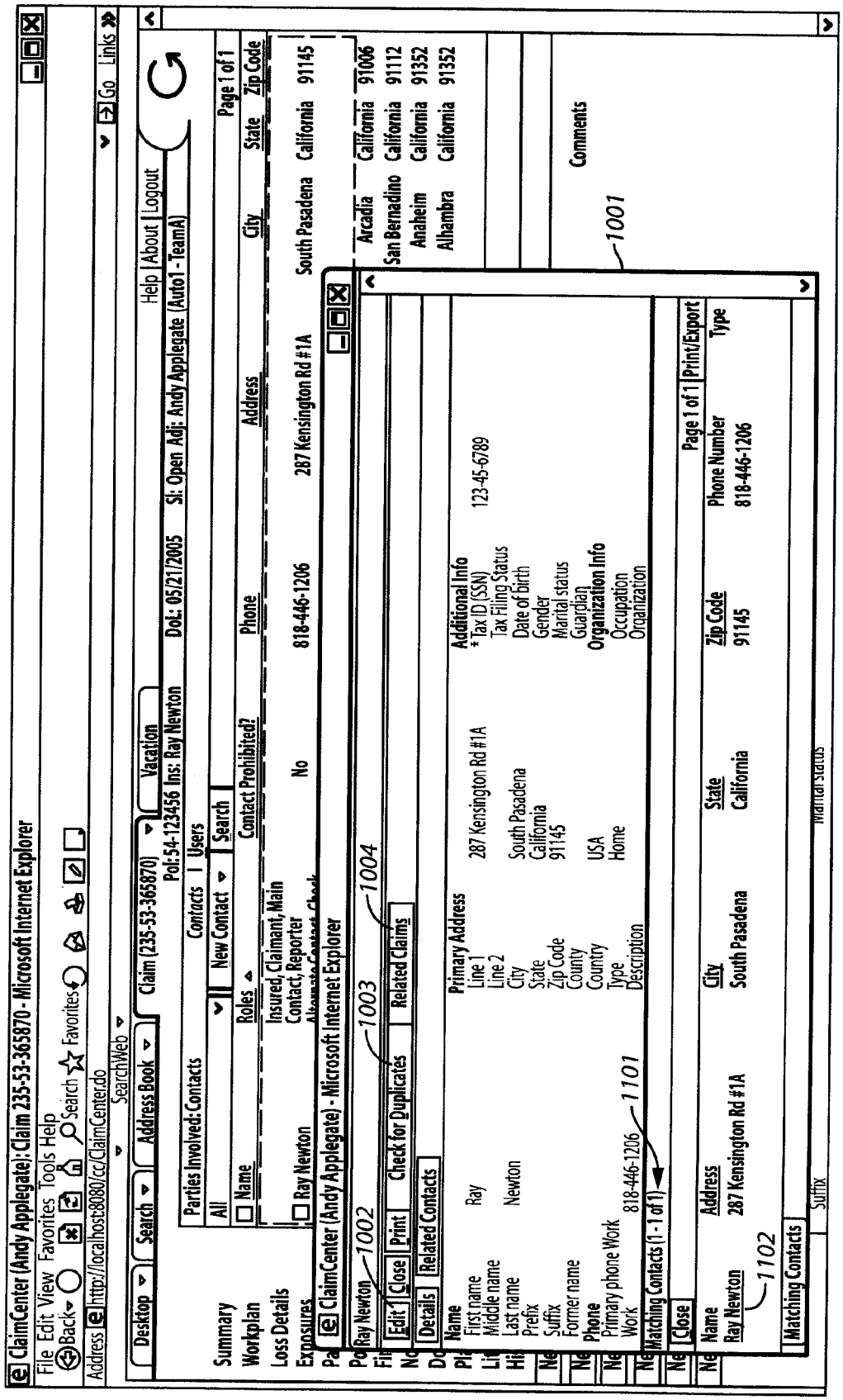
FIG. 11 comprises an illustrative user interface screen shot as configured in accordance with various embodiments of the invention.

If the user chooses to check duplicates 1003, then the screen shot of FIG. 11 is displayed. The address book display 1001 can then provide, for example, a matching contacts region 1101 of the display that lists any duplicate records in the address book. The user may then view a duplicate contact by selecting the name of the contact. In this example, the user would click on the underlined name "Ray Newton" 1102 shown in the matching contacts region 1101 of the address book display 1001. In an additional embodiment, the user may then be provided with an opportunity to remove or delete the duplicate entry, if the user has the appropriate authorization.

Figure 12:
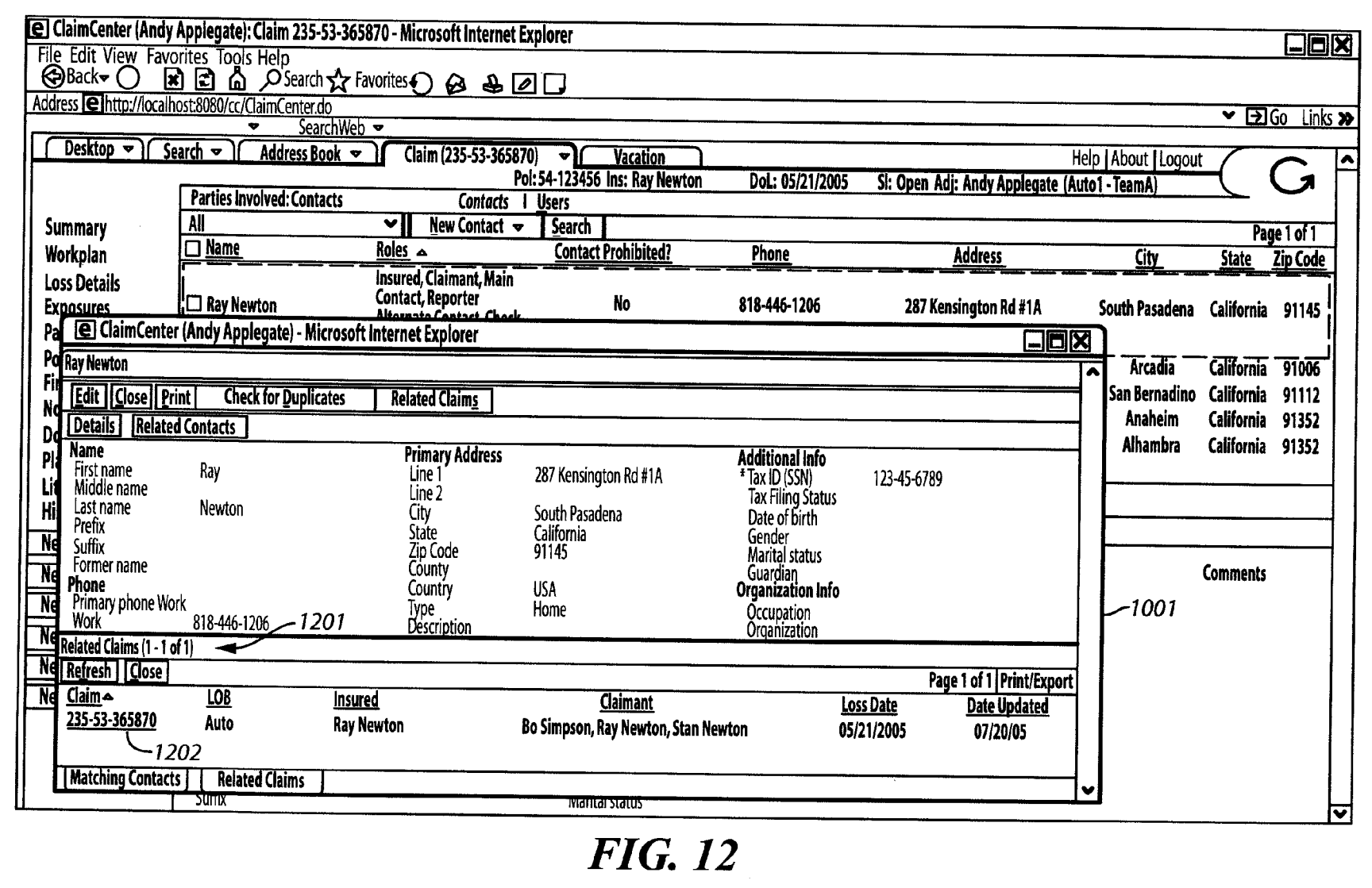

Further, the user can view any related claims by selecting the related claims button 1003, and then the screen shot of FIG. 12 is displayed. The address book display 1001 can provide, for example, a related claims region 1201 of the display which lists all the claims having a contact linked to this particular entry in the address book. The user may then view the related claims by selecting from the list of claims shown in the related claims region 1201. In this example, the user would click on the underlined claim "235-53-365780" 1202 to view the claim details.

Figure 17:
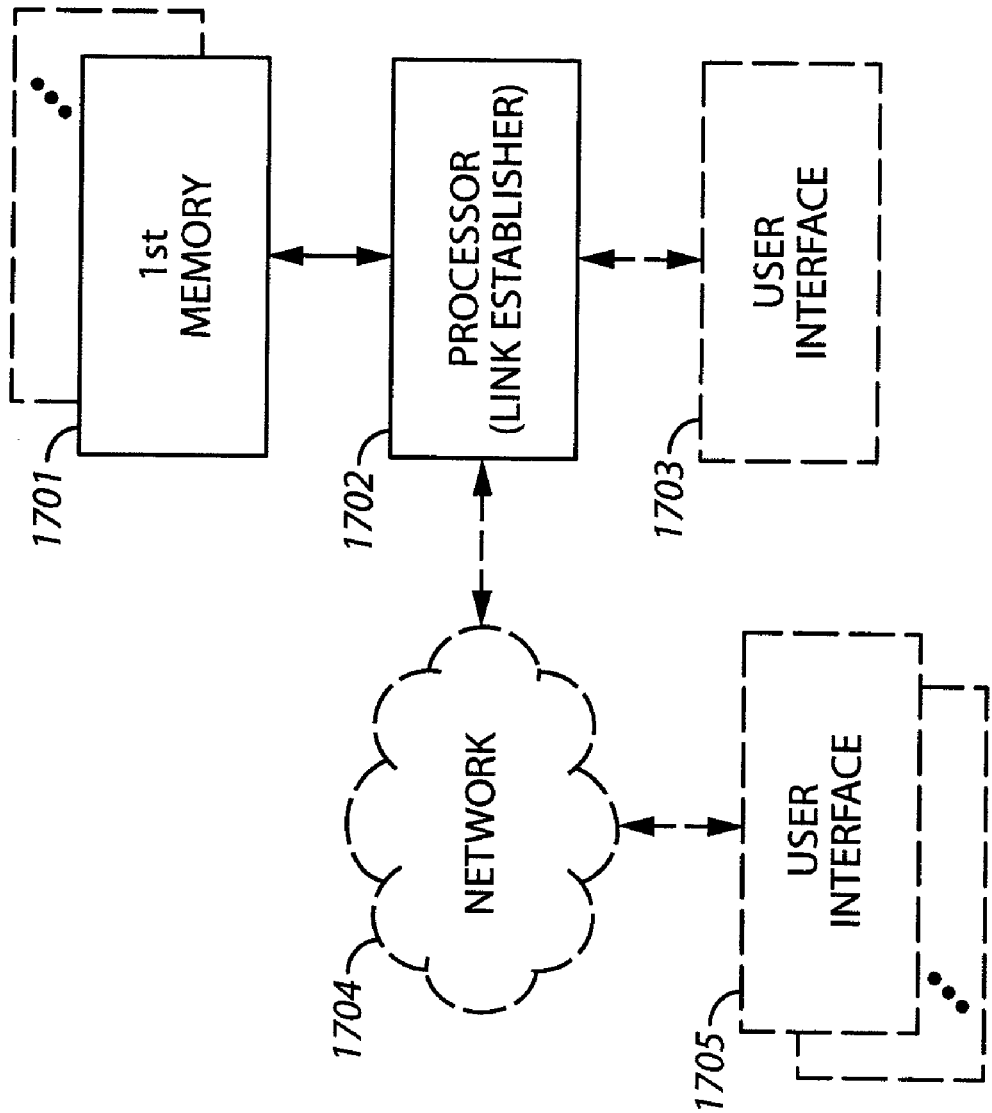
FIG. 17 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 17, an illustrative approach to such a platform will now be provided. FIG. 17 generally depicts pertinent portions of an incident-related work management computer-based processing system 1700. This computer-based processing system 1700 includes generally at least one memory 1701, a link establisher circuit 1702 operably coupled to the memory, and optionally a user interface 1703 (comprising, for example, a user display and a user input such as a keyboard and cursor control interface of choice) coupled to the link establisher circuit 1702.

The memory 1701 may comprise a first memory having an address book stored therein, wherein the address book contains a plurality of entries that persist independently of incident durations and wherein at least some of the entries comprise contact information for corresponding entities. The memory 1701 may also comprise a second memory having new contact information associated with a given incident and as regards an entity stored therein and as received via a user interface to provide stored contact information. It is appreciated that the first and second memory can be separate or can comprise a single storage platform. Such choices are well known in the art and do not require further elaboration. In this embodiment, the memory is partitioned into a first and second memory.

The link establisher circuit 1702 is operably coupled to the first memory and the second memory. The link establisher circuit 1702 is configured and arranged to provide for establishing a link between the stored contact information and a corresponding entry in the address book to thereby associate information that corresponds to a same entity, such that the link can facilitate subsequent processing of at least one of an incident and contact information.

The link establisher circuit 1702 may comprise, for example, a processing platform. The processing platform may then comprise an updating circuit configured and arranged to use the link to automatically update at least one of (1) the address to include information in the stored contact information that differs from corresponding information in the corresponding entry in the address book or (2) the stored contact information to include information from the corresponding entry in the address book that differs from corresponding information in the stored contact information.

In addition, the link establisher circuit 1702 may be further configured and arranged to provide for establishing a link by comparing the stored contact information with the entries in the address book to determine a measure of correspondence. When the measure of correspondence as corresponds to a given entry in the address book at least meets a predetermined level of certainty, the link establisher circuit then automatically links the stored contact information to the given entry with a link to provide linked information.

The incident-related work management computer-based processing system 1700 may optionally further comprise a display operably coupled to the link establisher circuit. The display may then selectively display, for example, at least one of:
linked information;
a notice regarding severance of the link;
a linked status indication;
an unlinking opportunity;
an unlinked status indication.

It is appreciated that the link establisher circuit 1702 may also be coupled to a network 1704. Other users may then input new contact information via a plurality of additional user interfaces 1705. This inputted new contact information may then be transferred via the network 1704 and stored in the memory 1701.

In such a computer-based processing system 1700 used in managing incident-related work, the memory 1701 may have computer instructions stored therein for use with the computer-based processing system 1700 and a user interface 1703. The computer instructions may provide for providing an address book that is accessible to the computer-based processing system 1700, the address book containing a plurality of entries that persist independently of incident durations and wherein at least some of the entries comprise contact information for corresponding entities. The computer instructions may then provide for receiving, via the user interface 1703, new contact information associated with a given incident and as regards an entity and then storing that information. The computer instructions may then further provide for providing for establishing a link between the stored contact information and a corresponding entry in the address book to thereby associate information that corresponds to a same entity, such that the link can facilitate subsequent processing of at least one of an incident and contact information.

Those skilled in the art will recognize and understand that such an apparatus 1700 may be comprised of a plurality of physically distinct elements as is suggested by the illustration shown in FIG. 17. It is also possible, however, to view this illustration as comprising a logical view, in which case one or more of these elements can be enabled and realized via a shared platform. It will also be understood that such a shared platform may comprise a wholly or at least partially programmable platform as are known in the art.

The teachings, as set forth above, permit storage of incident-related contact information separately from address book information, thereby providing for a user-friendly method of managing, comparing and linking incident-related contact information. As a result, a disconnected collection of data that is received regarding an incident may be efficiently processed and organized. Contact information may be readily linked to address book information to facilitate the management of claims related to a given incident. The link may further provide the means to update information, to detect whether the records are different, to retrieve information from the linked address book record, and to facilitate decision making with respect to the link. Thus, the described embodiments provide for the effective and intuitive management of incident-related work.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use with a computer-based processing system for use in managing incident-related work and that has a user interface, the method comprising:
providing an address book that is accessible to the computer-based processing system, the address book containing a plurality of entries that persist independently of incident durations and wherein at least some of the entries comprise entity contact information for corresponding entities;
receiving, via the user interface, new entity contact information associated with a given incident and an entity in the address book;
storing that contact information to provide new stored entity contact information that is available independent of given incident duration that is independently stored as compared to the address book, and wherein the new stored entity contact information can be different from entity contact information for the same entity as contained in the address book;
providing for establishing a link between the new stored entity contact information and a corresponding entry in the address book to thereby associate information that corresponds to a same entity, such that the link can facilitate subsequent processing of at least one of an incident and new entity contact information by permitting a user to display, for the entity, either the entity contact information for the entity as is contained in the address book and the new entity contact information for the entity as is stored by the computer-based processing system;
wherein establishing a link comprises providing an indication, via the user interface, to reflect a linked status as corresponds to the new stored entity contact information, wherein the linked status shows, when the new stored entity contact information and the corresponding entry in the address book are linked but contain differing information, whether the differing information is due to edits to the new stored entity information or edits to the corresponding entry in the address book.

2. The method of claim 1 wherein the new stored entity contact information and entity contact information comprises at least one of:

at least one entity name;
a government issued identifying character string;
a date of birth;
a family name;
a state of incorporation;
a marital status;
an age;
a legal status;
an occupation;
a primary business activity;
a former moniker;
a telephone number;
a mailing address;
a location address;
a network address;
a customer-definable field.

3. The method of claim 1 wherein the entity comprises at least one of:
a person;
a business entity;
a limited liability entity.

4. The method of claim 1 further comprising using the link to automatically update at least one of:
the address book to include information in the new stored entity contact information that differs from corresponding information in the corresponding entry in the address book; the new stored entity contact information to include information from the corresponding entry in the address book that differs from corresponding information in the new stored entity contact information.

5. The method of claim 4 further comprising preventing a user from updating the address book if the user made changes to a linked incident-related contact record which linked incident-related contact record is not initially identical to the corresponding entry in the address book.

6. The method of claim 1 wherein the linked status shows whether an incident-related contact record is linked to a record in the address book.

7. The method of claim 1 wherein the linked status shows whether information contained in the new stored entity contact information and the corresponding entry in the address book is identical.

8. The method of claim 1 wherein the linked status shows, when the new stored entity contact information and the corresponding entry in the address book are linked but contain differing information, at least one information field that differs as between the new stored entity contact information and the corresponding entry in the address book.

9. The method of claim 1 wherein providing an indication, via the user interface, to reflect a linked status further comprises providing an opportunity, via the user interface, to permit a user to unlink the new stored entity contact information from the corresponding entry in the address book.

10. The method of claim 1 wherein providing for establishing a link comprises:
comparing the new stored entity contact information with the entries in the address book to determine a measure of correspondence;
when the measure of correspondence as corresponds to a given entry in the address book at least meets a predetermined level of certainty, automatically linking the stored contact information to the given entry with a link to provide linked information.

11. The method of claim 10 further comprising:
when the measure of correspondence as corresponds to a given entry in the address book does not at least meet the predetermined level of certainty, not linking the new stored entity contact information to the given entry.

12. A method for use with a computer-based processing system for use in managing incident-related work and that has a user interface, the method comprising:
providing an address book that is accessible to the computer-based processing system, the address book containing a plurality of entries that persist independently of incident durations and wherein at least some of the entries comprise entity contact information for corresponding entities;
receiving, via the user interface, new entity contact information associated with a given incident and an entity in the address book;
storing that contact information to provide new stored entity contact information that is available independent of given incident duration that is independently stored as compared to the address book, and wherein the new stored entity contact information can be different from entity contact information for the same entity as contained in the address book;
providing for establishing a link between the new stored entity contact information and a corresponding entry in the address book to thereby associate information that corresponds to a same entity, such that the link can facilitate subsequent processing of at least one of an incident and new entity contact information by permitting a user to display, for the entity, either the entity contact information for the entity as is contained in the address book and the new entity contact information for the entity as is stored by the computer-based processing system;
wherein providing for establishing a link includes comparing the new stored entity contact information with the entries in the address book to determine a measure of correspondence;
when the measure of correspondence as corresponds to a given entry in the address book at least meets a predetermined level of certainty, automatically linking the stored contact information to the given entry with a link to provide linked information;
when the measure of correspondence as corresponds to a given entry in the address book does not at least meet the predetermined level of certainty, not linking the new stored entity contact information to the given entry;
wherein not linking the new stored entity contact information to the given entry further comprises providing an indication, via the user interface, to reflect an unlinked status as corresponds to the new stored entity contact information.

13. The method of claim 12 wherein comparing the new stored entity contact information with the entries in the address book to determine a measure of correspondence comprises:
comparing at least a first preselected information field in the new stored entity contact information against a corresponding field for at least some of the address book entries.

14. The method of claim 13 wherein the first preselected information field comprises a user-selectable preselected information field.

15. The method of claim 13 wherein comparing the new stored entity contact information with the entries in the address book to determine a measure of correspondence further comprises:
when the first preselected information field in the new stored entity contact information matches to at least a predetermined degree of similarity with the corresponding field in a particular address book entry, also determining whether at least one other information field in the new stored entity contact information matches to at least a predetermined degree of similarity with a corresponding field in the particular address book entry.

16. The method of claim 15 wherein the at least one other information field comprises a user-selectable other information field.

17. The method of claim 15 wherein comparing the new stored entity contact information with the entries in the address book to determine a measure of correspondence comprises:
when the at least one other information field in the new stored entity contact information matches to at least the predetermined degree of similarity with a corresponding field in the particular address book entry, determining that the measure of correspondence as corresponds to the given entry in the address book at least meets the predetermined level of certainty.

18. The method of claim 15 wherein comparing the new stored entity contact information with the entries in the address book to determine a measure of correspondence further comprises:
when the at least one other information field in the new stored entity contact information does not match to at least the predetermined degree of similarity with a corresponding field in the particular address book entry, but does match to at least a second predetermined degree of similarity, not automatically linking the new stored entity contact information to the given entry but providing, via the user interface, a user-assertable opportunity to instruct the new stored entity contact information to be linked to the given entry.

19. The method of claim 18 wherein comparing the new stored entity contact information with the entries in the address book to determine a measure of correspondence further comprises:
when the at least one other information field in the new stored entity contact information does not match to at least the predetermined degree of similarity with a corresponding field in the particular address book entry, and furthermore does not match to at least the second predetermined degree of similarity, not automatically linking the new stored entity contact information to the given entry and prohibiting a user from causing, via the user interface, the new stored entity contact information from being linked to the given entry.

20. The method of claim 19 further comprising:
when the at least one other information field in the stored contact information does not match to at least the predetermined degree of similarity with a corresponding field in the particular address book entry, and furthermore does not match to at least the second predetermined degree of similarity, providing a user with an opportunity, via the user interface, to create a new address book entry to contain at least a portion of the stored contact information.

21. The method of claim 20 wherein providing a user with an opportunity comprises determining whether the user has authorization to create the new address book entry and denying the opportunity when such authorization is absent.

22. The method of claim 19 further comprising:
when the at least one other information field in the new stored entity contact information does not match to at least the predetermined degree of similarity with a corresponding field in the particular address book entry, and furthermore does not match to at least the second predetermined degree of similarity, automatically creating a new address book entry to contain at least a portion of the new stored entity contact information.

23. The method of claim 1 further comprising:
receiving modifications to the corresponding entry in the address book;
automatically updating the new stored entity contact information to reflect the modifications.

24. The method of claim 1 further comprising:
displaying linked information via the user interface;
automatically determining whether the linked information is linked to an address book entry that has been deleted;
upon determining that the linked information is linked to an address book entry that has been deleted, automatically unlinking the linked information.

25. The method of claim 1 further comprising:
upon determining that linked information is linked to an address book entry that has been deleted, automatically providing a notice, via the user interface, that the information is no longer linked.

26. The method of claim 1 further comprising:
upon detecting an attempt to delete an address book entry, determining whether the address book entry to be deleted is linked to the new stored entity contact information;
upon determining that the address book entry to be deleted is linked to the stored contact information, preventing deletion of the address book entry.

27. The method of claim 1 wherein the incidents comprise insurance claims.

28. The method of claim 1 wherein the incidents comprise applications for a new insurance policy.

29. The method of claim 1 wherein the incidents comprise insurance policy renewal requests.

30. The method of claim 1 wherein the incidents comprise insurance policy changes.

31. The method of claim 1 further comprising using the link to verify appropriateness of an action to be taken with respect to the given one of the incidents.

32. The method of claim 1 further comprising using the link to use alternative candidate items of information when taking an action with respect to the given one of the incidents.

33. The method of claim 1 further comprising using the link to use an aggregated compilation of related items of information when taking an action with respect to the given one of the incidents.

34. The method of claim 1 further comprising using the link to update contact information as appears in each of a plurality of incidents that are each linked to a common address book entry with information from the common address book entry.

35. An incident-related work management computer-based processing system comprising:
a first memory having an address book stored therein, wherein the address book contains a plurality of entries that persist independently of incident durations and wherein at least some of the entries comprise contact information for corresponding entities;
a second memory having new contact information associated with a given incident and as regards an entity stored therein and as received via a user interface to provide stored contact information that is available independent of given incident duration the new contact information being independently stored as compared to the address book, and wherein the new contact information can be different from the contact information for the same entity as contained in the address book; and a link establisher circuit operably coupled to the first memory and the second memory that is configured and arranged to provide for establishing a link between the stored contact information and a corresponding entry in the address book to thereby associate information that corresponds to a same entity, such that the link can facilitate subsequent processing of at least one of an incident and contact information by permitting a user to display, for the entity, either the contact information for the entity as is contained in the address book or the new contact information for the entity as is stored in the second memory; the link establisher circuit being further configured to provide an indication, via the user interface, to reflect a linked status as corresponds to the new stored entity contact information, wherein the linked status shows, when the new stored entity contact information and the corresponding entry in the address book are linked but contain differing information, whether the differing information is due to edits to the new stored entity contact information or edits to the corresponding entry in the address book.

36. The incident-related work management computer-based processing system of claim 35 wherein the link establisher circuit comprises a processing platform.

37. The incident-related work management computer-based processing system of claim 36 wherein the processing platform further comprises an updating circuit configured and arranged to use the link to automatically update at least one of:
the address book to include information in the stored contact information that differs from corresponding information in the corresponding entry in the address book;
the stored contact information to include information from the corresponding entry in the address book that differs from corresponding information in the stored contact information.

38. The incident-related work management computer-based processing system of claim 35 wherein the link establisher circuit is further configured and arranged to provide for establishing a link by:
comparing the stored contact information with the entries in the address book to determine a measure of correspondence;
when the measure of correspondence as corresponds to a given entry in the address book at least meets a predetermined level of certainty, automatically linking the stored contact information to the given entry with a link to provide linked information.

39. The incident-related work management computer-based processing system of claim 35 further comprising:
a display operably coupled to the link establisher circuit.

40. The incident-related work management computer-based processing system of claim 39 wherein the display selectively displays at least one of:
linked information;
a notice regarding severance of the link;
a linked status indication;
an unlinking opportunity;
an unlinked status indication.

41. The incident-related work management computer-based processing system of claim 35 wherein the link establisher circuit comprises means for establishing a link between the stored contact information and a corresponding entry in the address book to thereby associate information that corresponds to a same entity, such that the link can facilitate subsequent processing of at least one of an incident and contact information.

42. A computer memory having computer instructions stored therein for use with a computer-based processing system for use in managing incident-related work and that has a user interface, the computer instructions providing for:
providing an address book that is accessible to the computer-based processing system, the address book containing a plurality of entries that persist independently of incident durations and wherein at least some of the entries comprise contact information for corresponding entities;
receiving, via the user interface, new contact information associated with a given incident and as regards an entity and storing that new contact information to provide new stored contact information that is independently stored as compared to the address book, and wherein the new stored contact information can be different from the contact information for the same entity as contained in the address book;
providing for establishing a link between the stored contact information and a corresponding entry in the address book to thereby associate information that corresponds to a same entity, such that the link can facilitate subsequent processing of at least one of an incident and contact information by permitting a user to display, for the entity, either the contact information for the entity as is contained in the address book or the new contact information for the entity as is stored by the computer-based processing system;
wherein establishing a link further includes providing an indication, via the end user interface, to reflect a linked status as corresponds to the new stored entity contact information, wherein the linked status shows, when the new stored entity contact information and the corresponding entry in the address book are linked but contain differing information, whether the differing information is due to edits to the new stored entity contact information or edits to the corresponding entry in the address book.

\* \* \* \* \*